US011965528B1

United States Patent
Heeter et al.

(10) Patent No.: US 11,965,528 B1
(45) Date of Patent: Apr. 23, 2024

(54) ADJUSTABLE AIR FLOW PLENUM WITH CIRCUMFERENTIAL MOVABLE CLOSURE FOR A FAN OF A GAS TURBINE ENGINE

(71) Applicants: Rolls-Royce North American Technologies Inc., Indianapolis, IN (US); Rolls-Royce Corporation, Indianapolis, IN (US)

(72) Inventors: Robert W. Heeter, Indianapolis, IN (US); Daniel E. Molnar, Jr., Indianapolis, IN (US); Jonathan M. Rivers, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/234,661

(22) Filed: Aug. 16, 2023

(51) Int. Cl.
*F02K 3/06* (2006.01)
*F04D 29/52* (2006.01)
*F04D 29/54* (2006.01)
*F04D 29/68* (2006.01)

(52) U.S. Cl.
CPC .............. *F04D 29/542* (2013.01); *F02K 3/06* (2013.01); *F04D 29/526* (2013.01); *F04D 29/68* (2013.01); *F05D 2220/36* (2013.01); *F05D 2240/12* (2013.01); *F05D 2240/14* (2013.01)

(58) Field of Classification Search
CPC ...... F02K 3/06; F04D 29/542; F05D 2220/36; F05D 2240/12; F05D 2240/14
See application file for complete search history.

(56) References Cited

U.S. PATENT DOCUMENTS

| 4,086,022 | A |   | 4/1978  | Freeman et al. |
|-----------|---|---|---------|----------------|
| 5,137,419 | A |   | 8/1992  | Waterman |
| 5,607,284 | A | * | 3/1997  | Byrne ............. F04D 29/526 |
|           |   |   |         | 415/58.7 |
| 5,762,470 | A |   | 6/1998  | Gelmedov et al. |
| 6,231,301 | B1|   | 5/2001  | Barnett et al. |
| 6,409,470 | B2|   | 6/2002  | Allford et al. |
| 6,497,551 | B1|   | 12/2002 | Hand et al. |
| 6,514,039 | B1|   | 2/2003  | Hand |
| 6,619,909 | B2|   | 9/2003  | Barnett et al. |
| 6,648,591 | B2|   | 11/2003 | Collins |
| 6,685,426 | B2|   | 2/2004  | Clark |
| 6,736,594 | B2|   | 5/2004  | Irie et al. |
| 6,832,890 | B2|   | 12/2004 | Booth |

(Continued)

FOREIGN PATENT DOCUMENTS

CN 113217469 A 8/2021
DE 102007056953 10/2015

(Continued)

*Primary Examiner* — Eric J Zamora Alvarez
*Assistant Examiner* — Theodore C Ribadeneyra
(74) *Attorney, Agent, or Firm* — Barnes & Thornburg LLP

(57) ABSTRACT

A fan case assembly adapted for use with a gas turbine engine includes a case at extends circumferentially at least partway about an axis of the gas turbine engine and a plurality of vanes. The case is formed to define a plenum that extends circumferentially at least partway about the axis. The plurality of vanes are arranged in the plenum and spaced apart circumferentially about the axis to define a plurality of inlet openings in fluid communication with the plenum.

20 Claims, 9 Drawing Sheets

(56) References Cited

U.S. PATENT DOCUMENTS

| | | |
|---|---|---|
| 6,905,305 B2 | 6/2005 | James |
| 6,935,833 B2 | 8/2005 | Seitz |
| 7,186,072 B2 | 3/2007 | Seitz |
| 7,210,905 B2 | 5/2007 | Lapworth |
| 7,575,412 B2 | 8/2009 | Seitz |
| 8,257,022 B2 | 9/2012 | Guemmer |
| 8,419,355 B2 | 4/2013 | Guemmer et al. |
| 8,602,720 B2 | 12/2013 | Goswami et al. |
| 8,845,269 B2 | 9/2014 | Agneray et al. |
| 8,915,699 B2 | 12/2014 | Brignole et al. |
| 9,638,213 B2 | 5/2017 | Obrecht et al. |
| 9,651,060 B2 | 5/2017 | Morel et al. |
| 9,957,976 B2 | 5/2018 | Allford |
| 10,024,336 B2 | 7/2018 | Obrecht et al. |
| 10,047,620 B2 | 8/2018 | Giacche et al. |
| 10,378,550 B2 | 8/2019 | Lim et al. |
| 10,450,869 B2 | 10/2019 | Brignole et al. |
| 10,539,154 B2 | 1/2020 | Mallina et al. |
| 11,078,805 B2 | 8/2021 | Joly et al. |
| 11,092,030 B2 | 8/2021 | Joly et al. |
| 11,131,322 B2 | 9/2021 | Grothe et al. |
| 11,473,438 B2 | 10/2022 | Reynolds et al. |
| 11,572,897 B1 | 2/2023 | Duong et al. |
| 2007/0147989 A1 | 6/2007 | Collins |
| 2008/0044273 A1 | 2/2008 | Khalid |
| 2012/0315131 A1 | 12/2012 | Mertens |
| 2020/0308970 A1* | 10/2020 | Reynolds .............. F04D 29/685 |
| 2023/0151825 A1* | 5/2023 | Shi ....................... F04D 29/526 |
| | | 415/220 |

FOREIGN PATENT DOCUMENTS

| | | |
|---|---|---|
| EP | 2434164 | 3/2012 |
| EP | 3081779 | 10/2016 |
| JP | 2003227497 A | 8/2003 |
| KR | 200930757 A | 3/2009 |

* cited by examiner

ADJUSTABLE AIR FLOW PLENUM WITH CIRCUMFERENTIAL MOVABLE CLOSURE FOR A FAN OF A GAS TURBINE ENGINE

STATEMENT REGARDING FEDERALLY SPONSORED RESEARCH OR DEVELOPMENT

Embodiments of the present disclosure were made with government support under Contract No. FA8650-19-D-2063 or FA8650-19-F-2078. The government may have certain rights.

FIELD OF THE DISCLOSURE

The present disclosure relates generally to gas turbine engines, and more specifically to fan assemblies for gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

In embedded gas turbine engine applications, the engine may experience high distortion in the form of pressure gradients and swirl. The pressure and swirl distortions may cause engine stall or other undesirable aeromechanical behavior. The fan of the gas turbine engine may include mitigation systems to reduce or minimize the negative effects of pressure and swirl distortions to improve stall margin of the engine.

SUMMARY

The present disclosure may comprise one or more of the following features and combinations thereof.

A fan case assembly may be adapted for use with a gas turbine engine. The fan case assembly may include a case, a plurality of vanes, and an inlet distortion mitigation system.

In some embodiments, the case may extend circumferentially at least partway about an axis to define an outer boundary of a gas path of the gas turbine engine. The case may be formed to define a plenum. The plenum may extend circumferentially at least partway about the axis and may be open to the gas path of the gas turbine engine.

In some embodiments, a plurality of vanes may be arranged in the plenum. The plurality of vanes may be spaced apart circumferentially about the axis to define a plurality of inlet openings in fluid communication with the plenum.

In some embodiments, the inlet distortion mitigation system may include a movable closure and a control unit. The movable closure may be mounted for movement relative to the case. The movable closure may be configured to rotate about the axis relative to the case and may move between a closed position and an open position. In the closed position, the movable closure may cover a plurality of inlet openings to the plenum to block fluid communication between the gas path and the plenum. In the open position, a plurality of slots in the movable closure may be aligned with the plurality of inlet openings to allow fluid communication between the gas path and the plenum. The control unit may be configured to move the movable closure between the closed position and the open position in response to preselected operating conditions. The control unit may minimize negative effects of pressure and swirl distortions in the gas turbine engine to improve stall margin for the gas turbine engine.

In some embodiments, the movable closure may include a band and a rod. The band may extend circumferentially at least partway about the axis. The band may extend axially between a first end and a second end. The first end may be located axially forward of the plurality of vanes. The second end may be located axially aft of the plurality of vanes. The rod may extend radially outward from the band through the case. The rod may couple to the control unit. The plurality of slots may extend radially through the band.

In some embodiments, the case may be formed to include a channel. The channel may extend axially and circumferentially at least part way about the axis. The movable closure may be located in the channel that may be formed in the case.

In some embodiments, each vane of the plurality of vanes may extend axially and circumferentially across the plenum. The plurality of slots may be formed in the movable closure and may extend axially and circumferentially.

In some embodiments, the control unit may include at least one actuator and a controller. The actuator may be coupled to the rod of the movable closure. The actuator may be configured to drive rotation of the movable closure. The controller may be coupled to at least one actuator. The controller may be configured to direct the at least one actuator to rotate the movable closure to the closed position when the gas turbine engine is in a cruise condition included in the preselected operating conditions.

In some embodiments, the movable closure may be configured to rotate about the axis relative to the case to a plurality of intermediate positions between the closed position and the open position. In the intermediate positions, the plurality of slots formed in the movable closure are partially aligned with the plurality of inlet openings to vary the fluid communication between the gas path of the gas turbine engine and the plenum.

In some embodiments, the control unit may further include a memory. The memory may be coupled to the controller. The memory may include a plurality of preprogrammed aircraft maneuvers. The preprogrammed aircraft maneuvers may each correspond to one of the closed position, the open position, and a plurality of intermediate positions between the closed position and the open position. The controller may be configured to detect a preprogrammed aircraft maneuver included in the plurality of preprogrammed aircraft maneuvers on the memory. The controller may direct at least one actuator to move the movable closure to a corresponding position in response to detecting the preprogrammed aircraft maneuver.

In some embodiments, the control unit further includes at least one sensor. The sensor may be coupled to the controller and configured to measure one of pressure, air speed, altitude, blade tip timing, blade rotational speed, attitude, and acceleration. The controller may be configured to receive a measurement from the at least one sensor. The controller may direct at least one actuator to move the movable closure to a corresponding position in response to the measurement of the at least one sensor.

According to another aspect of the present disclosure, a gas turbine engine may include a fan and a fan case assembly. The fan may include a fan rotor and a plurality of blades. The fan rotor may be configured to rotate about an axis of the gas turbine engine. The plurality of fan blades may be coupled to the fan rotor for rotation therewith.

In some embodiments, the fan case assembly may extend circumferentially around the plurality of fan blades. The fan case assembly may extend radially outward of the plurality of fan blades. The fan case assembly may include a case, a plurality of vanes, and an inlet distortion system.

In some embodiments, the case may extends circumferentially at least partway about the axis. The case may be formed to define a plenum. The plenum may extend circumferentially at least partway about the axis. The plenum may be open to a gas path of the gas turbine engine, In some embodiments, the plurality of vanes may be arranged in the plenum. The plurality of vanes may be spaced apart circumferentially about the axis to define a plurality of inlet openings in fluid communication with the plenum.

In some embodiments, the inlet distortion mitigation system may include a movable closure and a control unit. The movable closure may be mounted for movement relative to the case. The movable closure may be configured to rotate relative to the case to move between a closed position and an open position. In the closed position, the movable closure may cover the plurality of inlet openings to the plenum. In the open position, a plurality of slots in the movable closure may be aligned with the plurality of inlet openings. The control unit may be configured to move the movable closure between the closed position and the open position in response to preselected operating conditions.

In some embodiments, the movable closure includes a band and a rod. The band may extend circumferentially at least partway about the axis and axially between a first end and a second end. The first end may be located axially forward of the plurality of vanes. The second end may be located axially aft of the plurality of vanes. The rod may extend radially outward from the band through the case. The rod may couple to the control unit. The plurality of slots may extend radially through the band.

In some embodiments, the case may be formed to include a channel. The channel may extend axially and circumferentially at least part way about the axis. The movable closure may be located in the channel that may be formed in the case.

In some embodiments, each vane of the plurality of vanes may extend axially and circumferentially across the plenum. The plurality of slots may be formed in the movable closure and may extend axially and circumferentially.

In some embodiments, the movable closure may be configured to rotate relative to the case to a plurality of intermediate positions between the closed position and the open position. In the intermediate positions, the plurality of slots formed in the movable closure may be partially aligned with the plurality of inlet openings to vary the fluid communication between the gas path of the gas turbine engine and the plenum.

In some embodiments, the control unit may include at least one actuator and a controller. The actuator may be coupled to the movable closure. The actuator may be configured to drive rotation of the movable closure. The controller may be coupled to the at least one actuator. The controller may be configured to direct at least one actuator to rotate the movable closure to the closed position when the gas turbine engine is in a cruise condition included in the preselected operating conditions.

In some embodiments, the control unit may further include a memory. The memory may be coupled to the controller. The memory may include a including a plurality of preprogrammed aircraft maneuvers. The preprogrammed aircraft maneuvers may each correspond to one of the closed position, the open position, and a plurality of intermediate positions between the closed position and the open position.

In some embodiments, the controller may be configured to detect a preprogrammed aircraft maneuver included in the plurality of preprogrammed aircraft maneuvers on the memory. The controller may direct the at least one actuator to move the movable closure to a corresponding position in response to detecting the preprogrammed aircraft maneuver.

In some embodiments, the control unit may further include at least one sensor. The sensor may be coupled to the controller. The sensor may be configured to measure one of pressure, air speed, altitude, blade tip timing, blade rotational speed, attitude, and acceleration.

In some embodiments, the controller may be configured to receive a measurement from the at least one sensor. The controller may direct at least one actuator to move the movable closure to a corresponding position in response to the measurement of the at least one sensor.

According to another aspect of the present disclosure, a fan case assembly may be adapted for use with a gas turbine engine. The fan case assembly may include a case and an inlet distortion mitigation system.

In some embodiments, the case may extend circumferentially at least partway about an axis to define an outer boundary of a gas path of the gas turbine engine. The case may be formed to define a plenum and a plurality of inlet openings in fluid communication with the plenum and the gas turbine engine. The plenum may extend circumferentially at least partway about the axis.

In some embodiments, the inlet distortion mitigation system may include a movable closure mounted for movement relative to the case and a control unit. The movable closure may be configured to rotate about the axis relative to the case to move between a closed position and an open position. In the closed position, the movable closure may cover the plurality of inlet openings to block fluid communication between the gas path and the plenum. In the open position, a plurality of slots in the movable closure may be aligned with the plurality of inlet openings to allow fluid communication between the gas path and the plenum. The control unit may be configured to move the movable closure between the closed position and the open position in response to preselected operating conditions.

According to another aspect of the present disclosure, a method may include providing a fan case assembly. The fan case assembly may be adapted for use with a gas turbine engine.

In some embodiments, the fan case assembly may include a case, a plurality of vanes, and an inlet distortion system. The case may extend circumferentially at least partway about an axis of the gas turbine engine. The case may be formed to define a plenum that may extend circumferentially at least partway about the axis. The plurality of vanes may be arranged in the plenum. The plurality of vanes may be spaced apart circumferentially about the axis to define a plurality of inlet openings in fluid communication with the plenum. The inlet distortion mitigation system may include a movable closure mounted for rotation about the axis relative to the case.

In some embodiments, the method may further include locating the movable closure in a closed position. In the closed position, the movable closure may cover the plurality of inlet openings to the plenum to block fluid communication between a gas path of the gas turbine engine and the plenum.

In some embodiments, the method may further include rotating the movable closure from the closed position to an open position. In the open position, a plurality of slots in the movable closure may be aligned with the plurality of inlet openings to allow fluid communication between the gas path of the gas turbine engine and the plenum in response to one preselected operating condition included in a plurality of preselected operating conditions.

These and other features of the present disclosure will become more apparent from the following description of the illustrative embodiments.

DETAILED DESCRIPTION OF THE DRAWINGS

Figure 1:
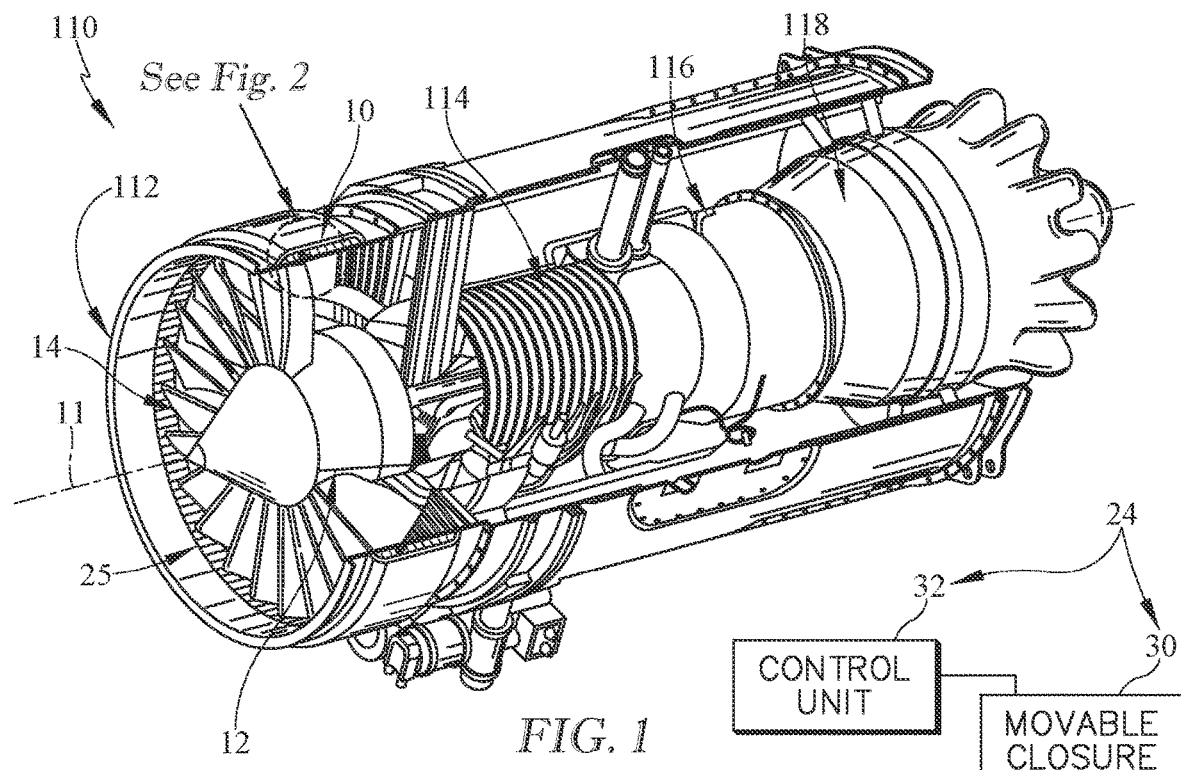
FIG. 1 is a cutaway view of a gas turbine engine that includes a fan, a compressor, a combustor, and a turbine, the fan including fan rotor configured to rotate about an axis of the engine and a fan case assembly that surrounds fan blades included in the fan rotor.

For the purposes of promoting an understanding of the principles of the disclosure, reference will now be made to a number of illustrative embodiments illustrated in the drawings and specific language will be used to describe the same.

A fan case assembly 10 is adapted for use in a gas turbine engine 110 as shown in FIG. 1. The gas turbine engine 110 includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about an axis 11 of the gas turbine engine 110 and drive the compressor 114 and the fan 112.

The fan 112 includes a fan rotor 12 and a fan case assembly 10 as shown in FIG. 1. The fan rotor 12 has a number of fan blades 14. The fan case assembly 10 extends circumferentially around the fan blades 14 of the fan rotor 12 such that the fan case assembly 10 is aligned axially with the fan blades 14.

Figure 2:
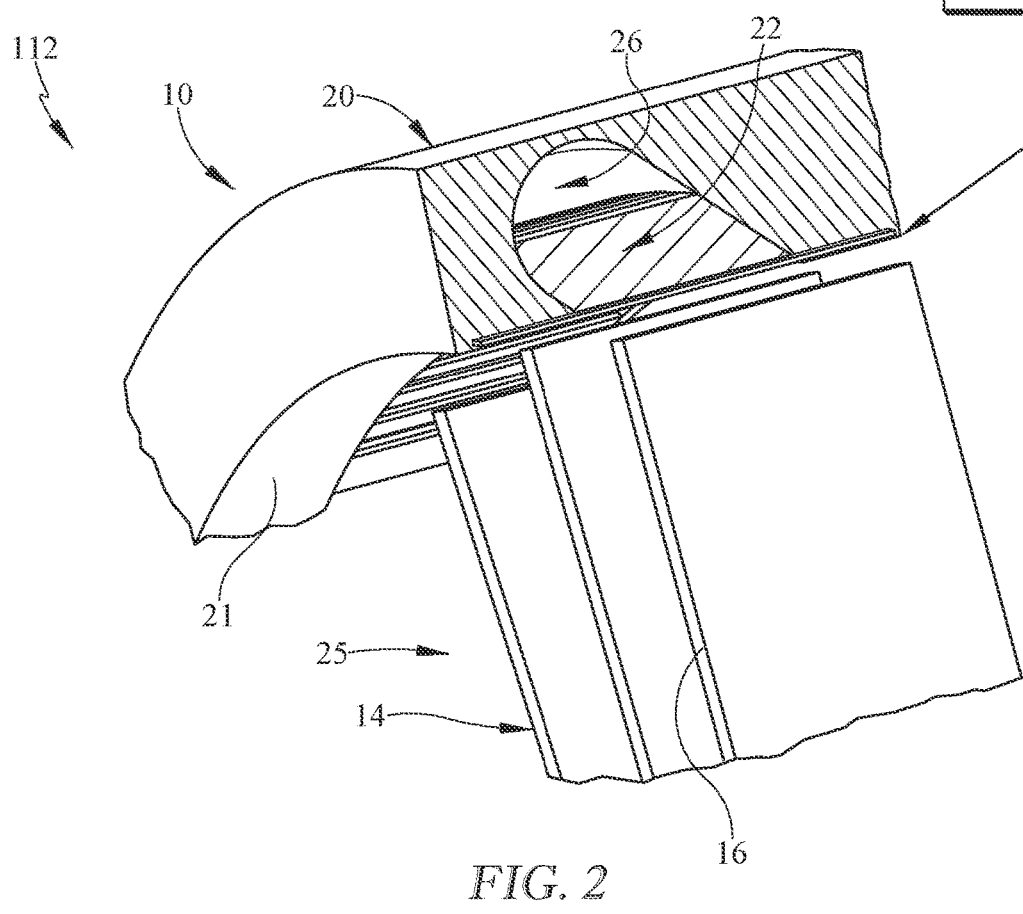
FIG. 2 is a detail view of the fan case assembly included in the gas turbine engine of FIG. 1 showing that the fan case assembly includes a case that extends circumferentially at least partway about an axis of the engine radially outward of the fan blades to define an outer boundary of a gas path of the gas turbine engine, a plurality of a plurality of vanes arranged in a plenum defined by the case to form a plurality of inlet openings in fluid communication with the plenum, and an inlet distortion mitigation system that includes a movable closure mounted for rotation about the axis relative to the case between a closed position as shown in FIG. 5A, an intermediate position as shown in FIG. 6A, and an open position as shown in FIG. 7A and a control unit configured to move the movable closure between the different positions in response to preselected operating conditions to control fluid communication between the plenum and the gas path so as to minimize the negative effects of pressure and swirl distortions in the gas turbine engine to improve stall margin.
Figure 3:
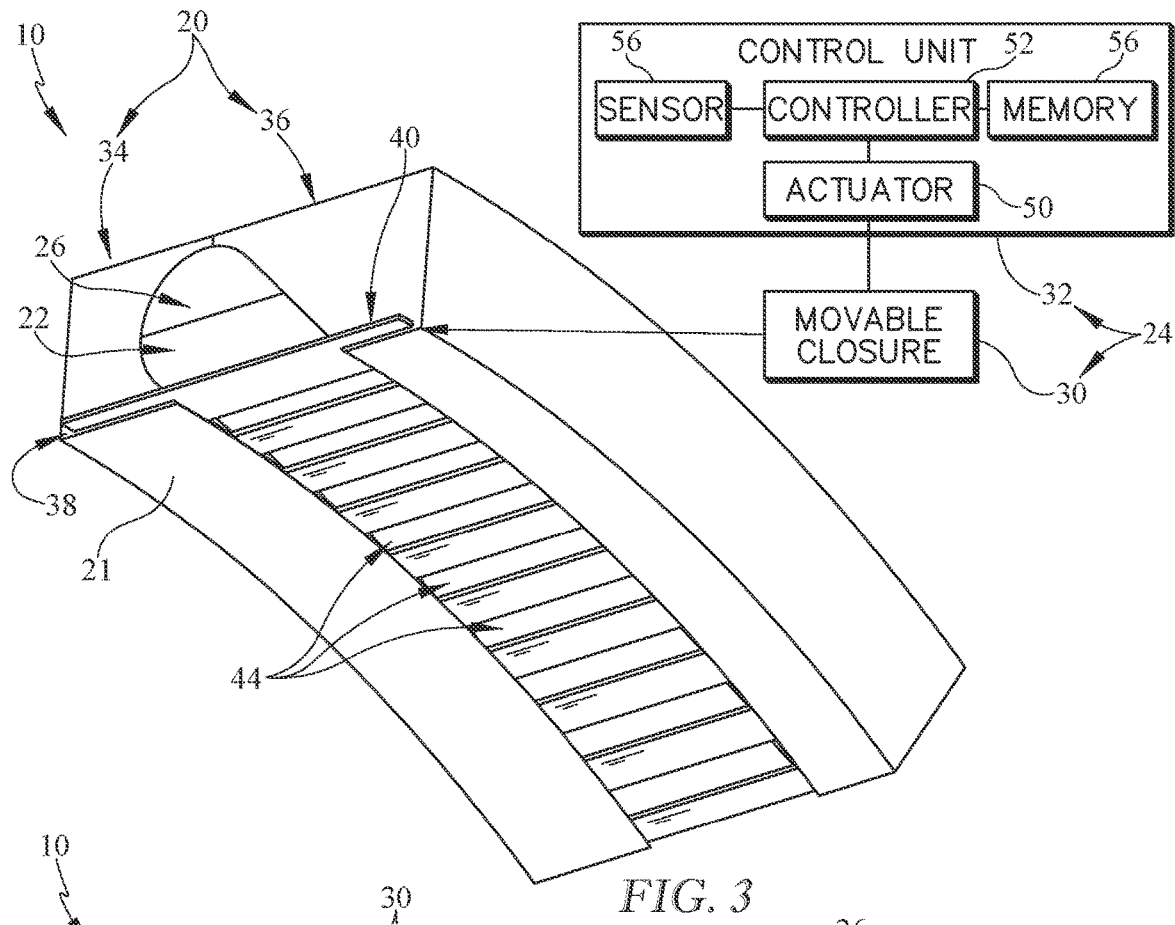
FIG. 3 is a perspective view of the fan case assembly of FIG. 2 showing the movable closure includes a band that extends circumferentially at least partway about the axis and axially between a first end located axially forward of the plurality of vanes and a second end located axially aft of the plurality of vanes and the band is formed to include a plurality of slots that align with the plurality of inlet openings defined between the vanes when the movable closure is in the open position.
Figure 4:
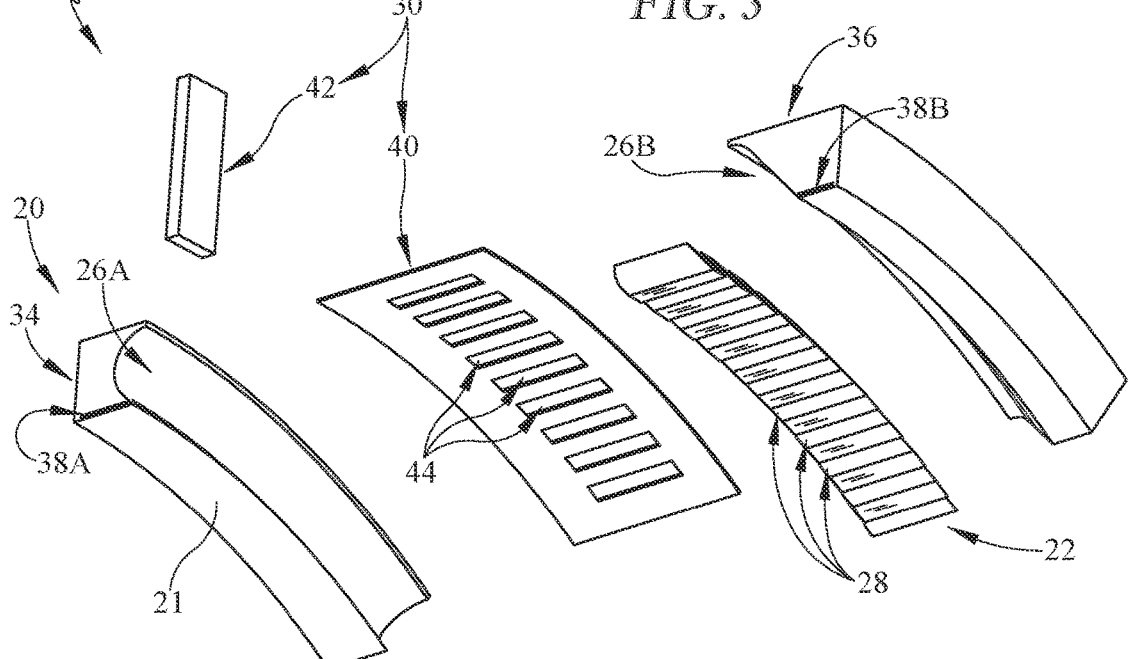
FIG. 4 is an exploded view of the fan case assembly of FIG. 3 showing the case is a split case including a forward section and an aft section that couples with the forward section to trap the movable closure axially therebetween in a channel formed in the case.

The fan case assembly 10 includes, among other components, a case 20, a plurality of vanes 22, and an inlet distortion mitigation system 24 as shown in FIGS. 2-4. The case 20 extends circumferentially at least partway about the axis 11 to define an outer boundary of a gas path 25 of the gas turbine engine 110. The case 20 is formed to define a plenum 26 that extends circumferentially at least partway about the axis 11 and is open to the gas path 25 of the gas turbine engine 110. The plurality of vanes 22 are arranged in the plenum 26. The plurality of vanes 22 are spaced apart circumferentially about the axis 11 to define a plurality of inlet openings 28 in fluid communication with the plenum 26. The inlet distortion mitigation system 24 is configured to control fluid communication between the plenum 26 and the gas path 25 of the gas turbine engine 110 through the plurality of inlet openings 28.

Figure 5A:
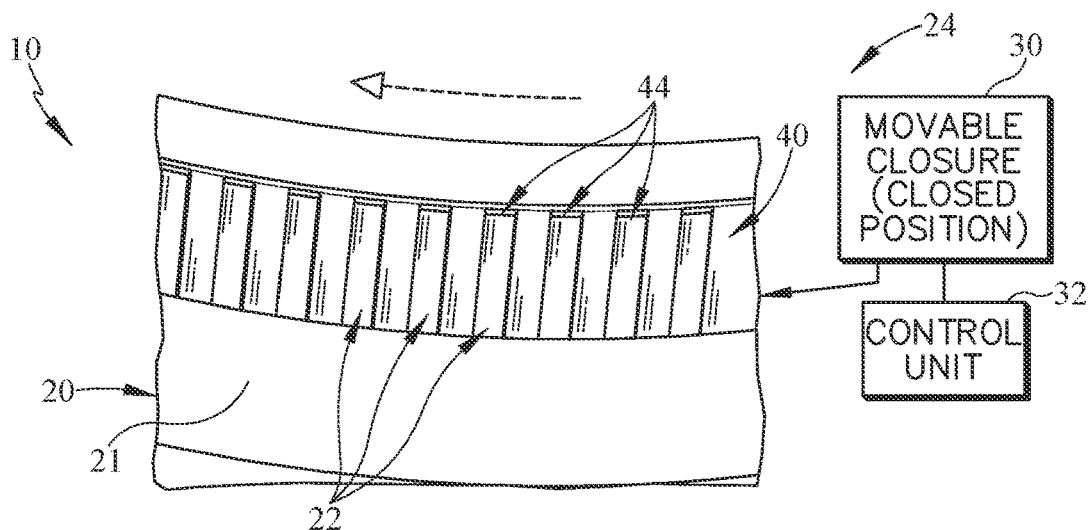
FIG. 5A is a radially-outwardly facing view of the fan case assembly of FIG. 3 with the movable closure in the closed position in which the movable closure covers the plurality of inlet openings to the plenum to block fluid communication between the gas path and the plenum.
Figure 6A:
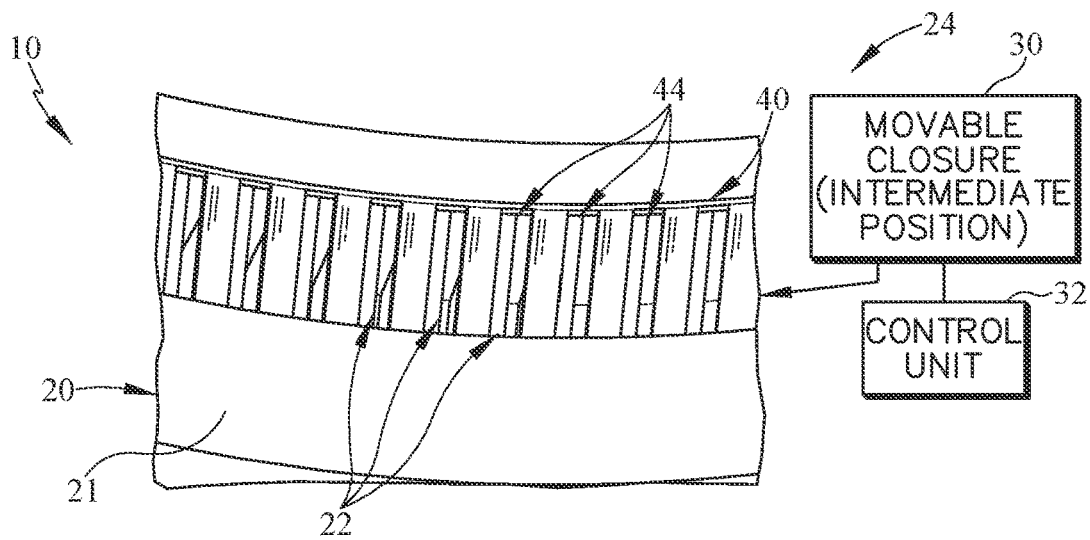
FIG. 6A is a radially-outwardly facing view of the fan case assembly of FIG. 3 with the movable closure in one intermediate position included in a plurality of intermediate positions between the closed position and the open position in which a plurality of slots formed in movable closure are partially aligned with the plurality of inlet openings to vary the fluid communication between the gas path and the plenum.
Figure 7A:
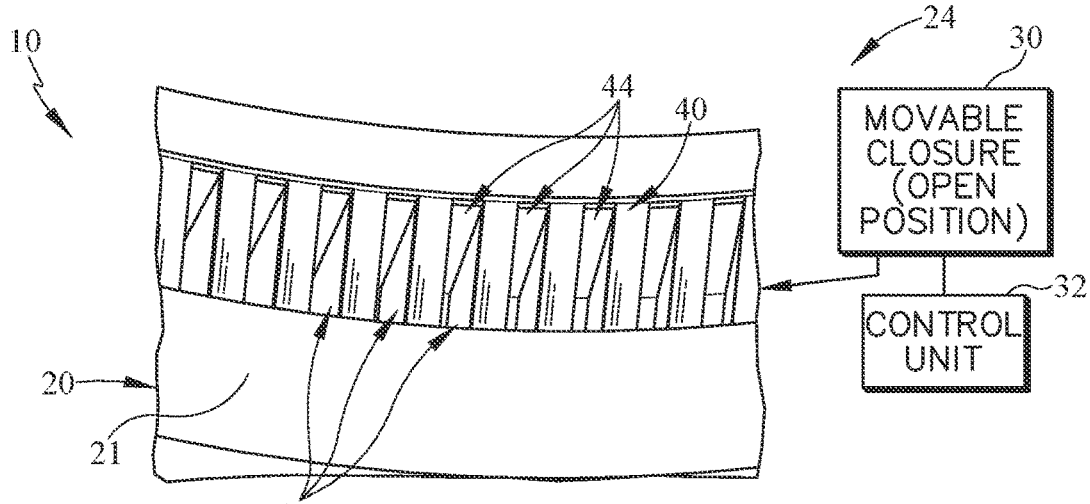
FIG. 7A is a radially-outwardly facing view of the fan case assembly of FIG. 3 with the movable closure in the open position in which the plurality of slots formed in the movable closure are aligned with the plurality of inlet openings to allow fluid communication between the gas path and the plenum.
Figure 5B:
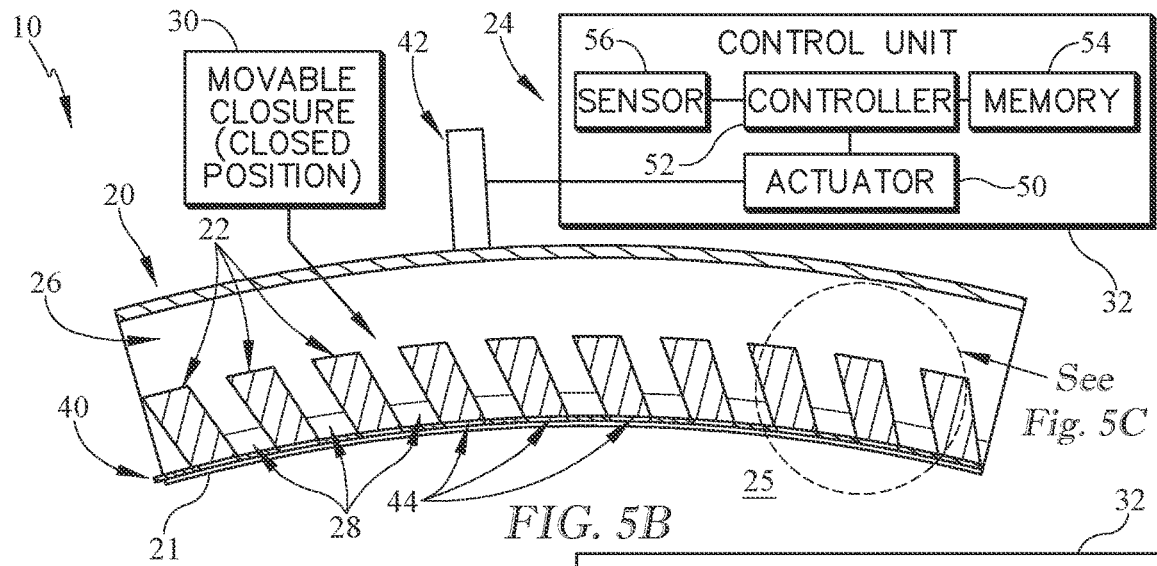
FIG. 5B is a cross-section view of the fan case assembly of FIG. 5A showing the movable closure in the closed position.
Figure 6B:
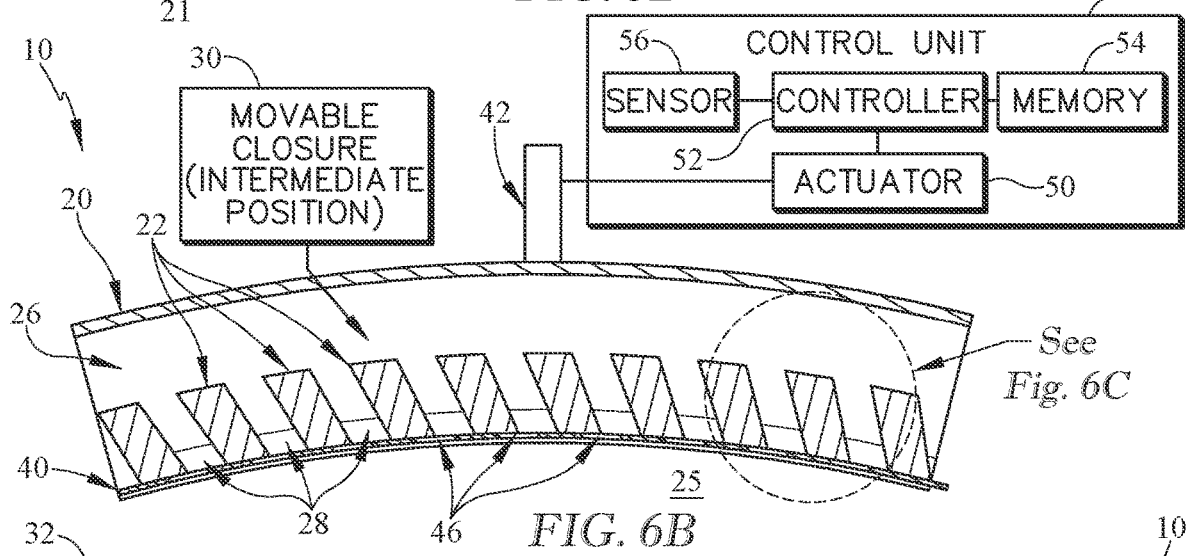
FIG. 6B is a cross-section view of the fan case assembly of FIG. 5A showing the movable closure in the intermediate position.
Figure 7B:
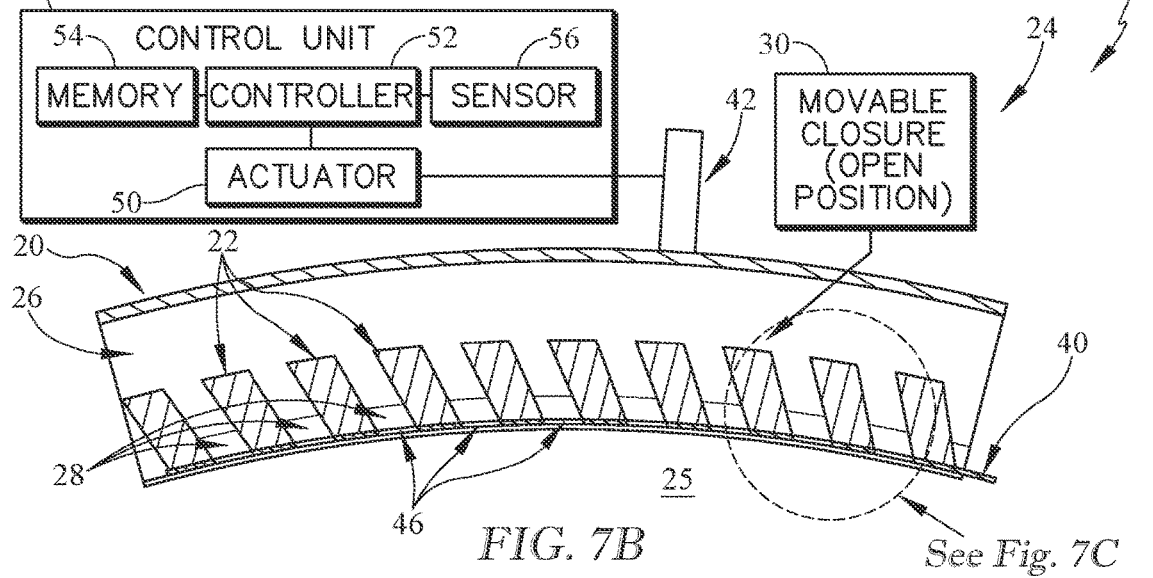
FIG. 7B is a cross-section view of the fan case assembly of FIG. 7A showing the movable closure in the open position.
Figure 5C:
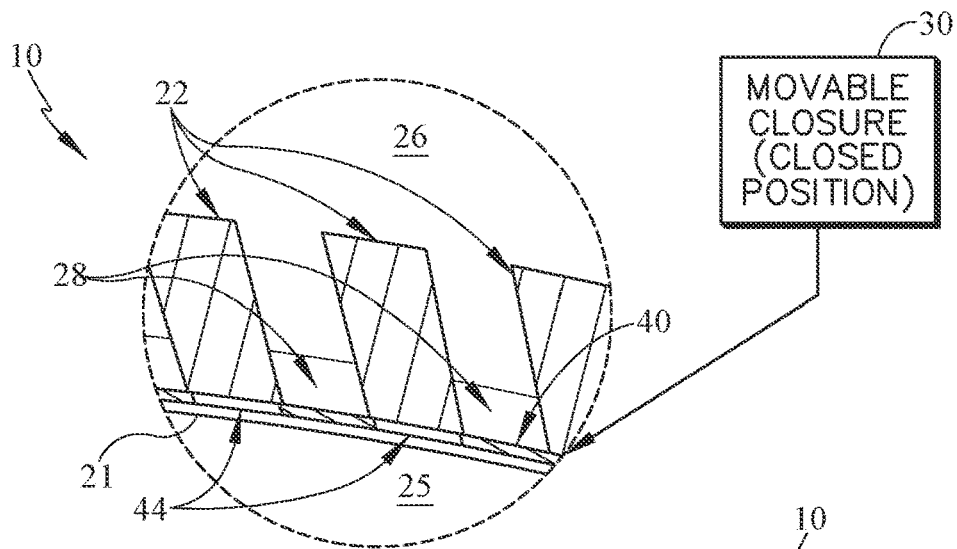
FIG. 5C is a detail view of FIG. 5B showing each of the slots in the movable closure are aligned with the vanes so that the movable closure covers the plurality of inlet openings to the plenum when the movable closure is in the closed position.
Figure 6C:
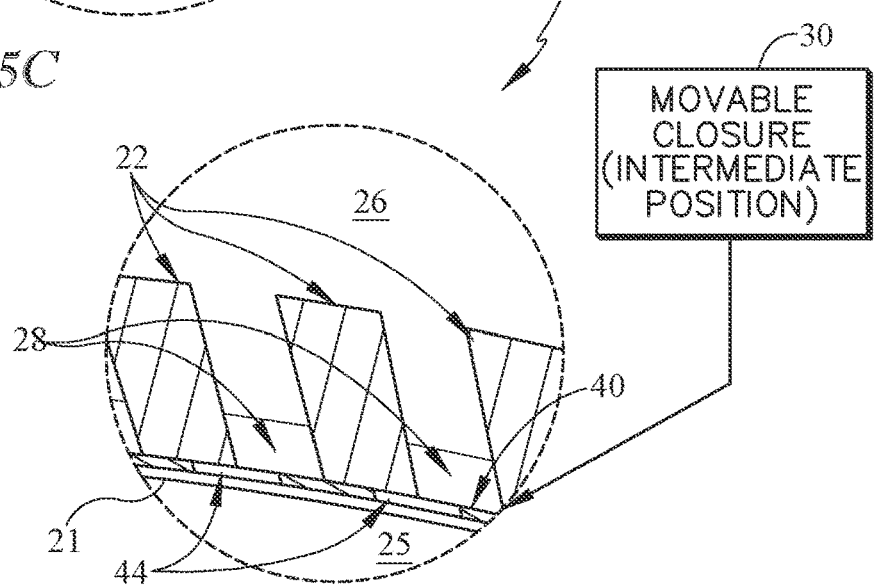
FIG. 6C is a detail view of FIG. 6B showing each of the slots in the movable closure are partially aligned with the inlet openings to vary the fluid communication between the gas path and the plenum when the movable closure is in one of the intermediate positions.
Figure 7C:
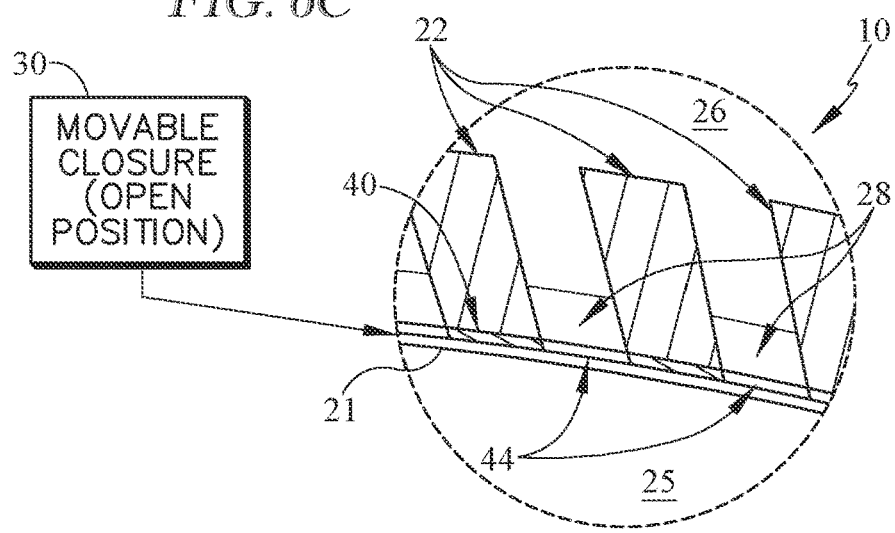
FIG. 7C is a detail view of FIG. 7B showing each of the slots in the movable closure are aligned the plurality of inlet openings to the plenum when the movable closure is in the open position.

The inlet distortion mitigation system 24 includes a movable closure 30 and a control unit 32 as shown in FIGS. 2-4. The movable closure 30 is mounted for rotation about the axis 11 relative to the case 20 between an open position as shown in FIGS. 5A and 5B, a plurality of intermediate positions as shown in FIGS. 6A and 6B, and a closed position as shown in FIGS. 7A and 7B. The control unit 32 is configured to move the movable closure 30 between the different positions in response to preselected operating conditions to control fluid communication between the plenum 26 and the gas path 25 so as to minimize the negative effects of pressure and swirl distortions in the gas turbine engine 110 to improve stall margin.

Embedded engines on an aircraft may experience high distortion in the form of pressure gradients and swirl. The pressure and swirl distortions may cause engine stall or other undesirable aeromechanical behavior. Additionally, there may be points during a mission or moments with maneuvers where it may be desirable to incorporate a different available stall margin or to be able to more evenly distribute flows. Attempting to solve the worst stall condition while maintaining performance over all of the cycles or flight conditions may be difficult and result in compromised efficiency or a limited flight envelope.

Therefore, the fan case assembly 10 includes the inlet distortion mitigation system 24 which includes the movable closure 30 that rotates about the axis 11 relative to the case 20 to control fluid communication between the plenum 26 and the gas path 25. In this way, the negative effects of pressure and swirl distortions are minimized to improve stall margin. The negative effects may include loss of efficiency or overall performance of the engine 110 and/or other negative operating conditions known to one of ordinary skill in the art.

In the closed position, the movable closure 30 covers the plurality of inlet openings 28 to the plenum 26 to block fluid communication between the gas path 25 and the plenum 26 as shown in FIGS. 7A and 7B. In the open position, a plurality of slots 44 in the movable closure 30 are aligned with the plurality of inlet openings 28 to allow fluid communication between the gas path and the plenum 26 as shown in FIGS. 5A and 5B. This permits air pressure and flows to better equalize circumferentially to improve stall margin.

The plurality of intermediate positions are between the closed position and the open position. In any one of the intermediate positions, the plurality of slots 44 are partially aligned with the plurality of inlet openings 28 to adjust the fluid communication between the plenum 26 and the gas path 25 as shown in FIGS. 6A and 6B. The further the movable closure 30 is rotated in the one direction, the smaller the opening The control unit 32 is configured to move the movable closure 30 between the different positions in response to preselected operating conditions. The preselected operating conditions include a plurality of preprogrammed aircraft maneuvers stored on a memory 54 included in the control unit 32. The plurality of preprogrammed aircraft maneuvers include banks, turns, rolls, etc.

The control unit 32 is configured to detect a preprogrammed aircraft maneuver included in the plurality of preprogrammed aircraft maneuvers on the memory 54. Once the preprogrammed aircraft maneuver is detected, the control unit 32 directs the movable closure to move to a corresponding position in response to detecting the preprogrammed aircraft maneuver.

For example, the movable closure 30 may normally be in the closed position during a cruise condition so that no additional stall margin is created, but performance is not compromised. The cruise condition included in the preselected operating conditions corresponds when the aircraft is in the cruise portion of the flight cycle.

Then, when the control unit 32 detects a preprogrammed aircraft maneuver, i.e. banks, turns, rolls, the control unit 32 directs the movable closure to rotate to one of the intermediate positions or the open position so that flow is permitted into the plenum 26. This permits air pressure and flows to better equalize circumferentially around the fan 112 thereby minimizing the negative effect of pressure and swirl distortions to improve stall margin.

Conversely, when the control unit 32 detects the cruise condition after a preprogrammed aircraft maneuver, the control unit 32 directs the movable closure 30 to move to the closed position. Therefore, once the aircraft maneuver is completed, the movable closure 30 moves to the closed position to performance is not compromised and the additional stall margin is removed during the cruise condition.

The preselected operating conditions may further include a sensor input from at least one sensor 56 included in the control unit 32. The sensor 56 is configured to measure one of pressure, air speed, and acceleration. The sensor 56 is also configured to detect distortion, fan stall, and/or other aeromechanical issues. In some embodiments, the control unit 32 includes a plurality of sensors 56 each configured to measure one of pressure, air speed, and acceleration and detect distortion, fan stall, and/or other aeromechanical issues.

The sensor 56 may include one of or a combination of dynamic sensors, static wall pressure sensors, altitude sensors, sensors configured to detect the angle of attack of the plurality of fan blades 14, sensors configured to detect the tip timing of the plurality of fan blades 14, and air speed sensors. In some embodiments, the sensor 56 may be a dynamic pressure transducer. The sensor 56 may also be a sensor configured to measure a rotational speed of the fan blades 14, which could be used along with an additional sensor that is a dynamic pressure transducer. In some embodiments, the sensor 56 may be a sensor configured to measure a rotation speed of another section of the engine 110.

The control unit 32 is configured to receive a measurement from the at least one sensor 56 or sensors 56 and direct the movable closure 30 to move to a corresponding position in response to the measurement of the at least one sensor 56. The control unit 32 may be configured to direct the movable closure 30 to be in the closed position when the measurements from the sensor 56 are within a predetermined threshold.

Then, when the measurement from the sensor 56 is outside of the predetermined threshold, the control unit 32 directs the movable closure 30 to move to one of the intermediate positions or the open position. Based on the difference of the measurement from the sensor 56 compared to the predetermined threshold, the control unit 32 may vary the position of the movable closure 30 to control the amount of fluid communication between the gas path 25 and the plenum 26 through the slots 44 in the movable closure 30.

In some embodiments, the control unit 32 may be configured to use a combination of the sensor measurements and the detected preprogrammed aircraft maneuver to control the position of the movable closure 30. For example, when the control unit 32 detects a preprogrammed aircraft maneuver and the measurement is outside of the predetermined threshold, the control unit 32 directs the movable closure 30 rotate to one of the intermediate positions or the open position.

In some embodiments, the control unit 32 is configured to use the measurements from the sensor 56 to anticipate the aircraft maneuver. The control unit 32 is configured to direct the movable closure 30 to move to one of the intermediate positions or the open position in response to the measurement from the sensor 56 even though no preprogrammed aircraft maneuver is detected.

Alternatively, there may be a delay in the measurements from the sensor 56. Therefore, the control unit 32 is also configured to direct the movable closure 30 to move to one of the intermediate positions or the open position when the one of the preprogrammed aircraft maneuvers is detected, even though the measurements from the sensor 56 are within the predetermined thresholds.

In some embodiments, the control unit 32 may detect one of the preprogrammed aircraft maneuvers, but the measurements from the sensors 56 are within the predetermined threshold. If so, the control unit 32 may direct the movable closure 30 to remain in the current position.

The movable closure 30 includes a band 40 and a rod 42 as shown in FIGS. 2-4. The band 40 extends circumferentially at least partway about the axis 11. The band 40 extends axially between a first end located axially forward of the plurality of vanes 22 and a second end located axially aft of the plurality of vanes 22. The rod 42 extends radially outward from the band 40 through the case 20 and couples to the control unit 32. The plurality of slots 44 extend radially through the band 40 as shown in FIGS. 2-4.

Turning again to the fan case assembly 10, the fan case assembly 10 extends circumferentially at least partway about the axis 11 in the illustrative embodiment. In some embodiments, the fan 112 may include multiple fan case assemblies 10 arranged circumferentially about the axis 11 to form a full hoop. In some embodiments, the fan case assembly 10 may be annular and extends circumferentially about the axis 11. In some embodiments, the case 20 may extend around the axis 11, while the plenum 26 only extends partway about the axis 11.

In some embodiments, the fan 112 may include multiple fan case assemblies 10 spaced apart circumferentially about the axis 11 to define segments between each fan case assembly 10. The segments between the fan case assemblies 10 does not have a plenum 26 so that the plenums 26 of each of the fan case assemblies 10 are independent from each other.

The case 20 includes a forward section 34 and an aft section 36 as shown in FIG. 4. The forward section 34 is coupled to the aft section 36 to form the case 20. The forward and aft sections 34, 36 trap the band 40 of the movable closure 30 in a channel 38 formed by the case 20.

The plenum 26 is formed in the case 20 so that the plenum 26 is located at a leading edge 16 of each of the fan blades 14 as shown in FIG. 2. In the illustrative embodiment, the plenum 26 has a forward leaning cross-sectional shape as shown in FIGS. 2 and 3. In other embodiments, the plenum 26 may have another cross-sectional shape.

In the illustrative embodiment, the forward section 34 of the case 20 is formed to define a forward portion 26A of the plenum 26. The aft section 36 of the case 20 is formed to define an aft portion 26B of the plenum 26.

In the illustrative embodiment, the channel 38 extends circumferentially at least partway about the axis 11 as shown in FIGS. 2-4. The channel 38 is spaced radially outward of an inner surface 21 of the case 20 that defines the outer boundary of the gas path 25. Therefore, the movable closure 30 is spaced radially outward from the inner surface 21 so that a radial offset is formed therebetween. In other embodiments, the movable closure 30 defines a portion of the outer boundary of the gas path 25.

In the illustrative embodiment, the forward section 34 of the case 20 is formed to define a forward portion 38A of the channel 38 as shown in FIG. 4. The aft section 36 of the case 20 is formed to define an aft portion 38B of the channel 38 as shown in FIG. 4.

Each of the vanes 22 extends axially across the plenum 26 as shown in FIGS. 2-4. In the illustrative embodiment, the vanes 22 are tilted circumferentially relative to the axis 11.

The inlet distortion mitigation system 24 includes the movable closure 30 and the control unit 32 as shown in FIGS. 2-4. The control unit 32 is coupled to the movable closure 30 to control rotation thereof.

The movable closure 30 includes the band 40 that extends circumferentially at least partway about the axis 11 and the rod 42 that extends radially outward from the band 40 through the case 20 and couples to the control unit 32. In some embodiments, the band 40 extends around the axis 11 to form a fully hoop and a single rod 42 extends radially outward from the band 40 to control rotation of the band 40. In some embodiments, the movable closure 30 includes a plurality of rods 42 that extend from the band 40 at different circumferentially location around the band 40.

In embodiments where the fan 112 includes a plurality of fan case assemblies 10, each band segment 40 includes a rod 42. The control unit 32 is coupled to each rod 42 to individually control rotation each of movable closure 30.

In some embodiments, the movable closure 30 may include a rack and pinion assembly to drive rotation of the band 40. Instead of extending through the case 20, the rod 42 may be contained in the case and extend circumferentially partway about the axis 11. The rod 42 may function as a rack with teeth that mate with a corresponding gear. The gear may be coupled to the actuator 50 of the control unit 32 to drive rotation of the gear which in turn drives rotation of the band 40.

In some embodiments, another suitable actuation assembly may be used. For example, the movable closure 30 may include an actuation system similar to those used to control variable vanes. In some embodiments, the movable closure 30 may include an actuation system similar to the one as described in U.S. Pat. No. 8,435,000, titled "VARIABLE VANE ACTUATION SYSTEM," which is hereby incorporated herein by reference in its entirety for its disclosure relative to the actuation system. The moveable closure 30 may include another suitable mechanical drive mechanism or linkage coupled to the band 40 to drive rotation of the band 40 about the axis 11.

The band 40 includes the plurality of slots 44 as shown in FIGS. 2-4. The plurality of slots 44 extend radially through the band 40 between the circumferential ends of the band 40. The rod 42 extends radially outward from the band 40 axially forward or axially aft of the plurality of slots 44.

The control unit 32 includes at least one actuator 50, a controller 52, a memory 54, and at least one sensor 56 as shown in FIGS. 2-4. The actuator is coupled to the band 40 of the movable closure 30. The actuator 50 is configured to drive rotation of the movable closure 30. The controller 52 is coupled to the actuator 50 to direct the actuator 50 to rotate the movable closure between the different positions. The memory 54 stores the preprogrammed aircraft maneuvers and the predetermined thresholds. The memory 54 may also include another suitable lookup table on the system of the aircraft to direct the movement of the movable closure 30.

The actuator 50 is configured to drive rotation of the movable closure 30 between the closed position as shown in FIGS. 5A and 5B, the plurality of intermediate positions as shown in FIGS. 6A and 6B, and the open position as shown in FIGS. 7A and 7B.

In the illustrative embodiment, the control unit 32 includes a single actuator 50 coupled to the rod 42 to drive rotation of the movable closure 30. If the fan 112 includes multiple fan case assemblies 10 spaced apart around the axis 11, the control unit 32 may include multiple actuators 50 to control rotation of each movable closure 30. Each actuator 50 may be coupled to the rod 42 included in the respective movable closure 30.

In some embodiments, the actuator 50 may include pneumatic or electric actuators, or combinations of hydraulic, pneumatic, and electric. Any other actuator known to a person skilled in the art could be utilized as well.

The controller 52 is configured to direct the actuator 50 to move the movable closure 30 between the different positions in response to preselected operating conditions. The preselected operating conditions include the plurality of preprogrammed aircraft maneuvers stored on the memory 54 included in the control unit 32.

The controller 52 of the control unit 32 is configured to detect a preprogrammed aircraft maneuver included in the plurality of preprogrammed aircraft maneuvers on the memory 54. Once the preprogrammed aircraft maneuver is detected, the controller 52 directs the actuator 50 to drive rotation of the movable closure 30 to a corresponding position in response to detecting the preprogrammed aircraft maneuver.

The preselected operating conditions may further include a sensor input from the sensor 56 or sensors 56 included in the control unit 32. The sensor 56 is configured to measure one of pressure, air speed, altitude, blade tip timing, blade rotational speed, attitude or aircraft orientation, and acceleration.

The controller 52 of the control unit 32 is configured to receive a measurement from the sensor 56 or sensors 56 and direct the actuator 50 to move the movable closure 30 to a corresponding position in response to the measurement of the at least one sensor 56. The controller 52 of the control unit 32 may be configured to direct actuator 50 to move the movable closure 30 to the closed position when the measurements from the sensor 56 are within a predetermined threshold.

Then, when the measurement from the sensor 56 is outside of the predetermined threshold, the controller 52 directs the actuator 50 to move the movable closure 30 to one of the intermediate positions or the open position. Based on the difference of the measurement from the sensor 56 compared to the predetermined threshold, the controller 52 may vary the position of the movable closure 30 to control the amount of fluid communication between the gas path 25 and the plenum 26 through the slots 44 in the movable closure 30.

In some embodiments, the controller 52 of the control unit 32 may be configured to use a combination of the sensor measurements and the detected preprogrammed aircraft maneuver to control the position of the movable closure 30. For example, when the controller 52 of the control unit 32 detects a preprogrammed aircraft maneuver and the measurement is outside of the predetermined threshold, the controller 52 directs the actuator 50 to rotate the movable closure 30 to one of the intermediate positions or the open position.

In some embodiments, the controller 52 of the control unit 32 is configured to use the measurements from the sensor 56 to anticipate the aircraft maneuver. The controller 52 of the control unit 32 is configured to direct the actuator 50 to move the movable closure 30 to one of the intermediate positions or the open position in response to the measurement from the sensor 56 even though no preprogrammed aircraft maneuver is detected.

Alternatively, there may be a delay in the measurements from the sensor 56. Therefore, the controller 52 of the control unit 32 is also configured to direct the actuator 50 to move the movable closure 30 to one of the intermediate positions or the open position when the one of the preprogrammed aircraft maneuvers is detected, even though the measurements from the sensor 56 are within the predetermined thresholds.

In some embodiments, the controller 52 of the control unit 32 may detect one of the preprogrammed aircraft maneuvers, but the measurements from the sensors 56 are within the predetermined threshold. If so, the controller 52 of the control unit 32 may direct the movable closure 30 to remain in the current position.

A method of operating the inlet distortion mitigation system 24 may include several steps. During normal cruise conditions, the controller 52 directs the actuator 50 to locate the movable closure 30 in the closed position. If the controller 52 detects one of a preselected operating condition other than the cruise condition, the controller 52 directs the actuator 50 to rotate the movable closure 30 to one of the open position or one of the intermediate positions depending on the operating condition detected to minimize the negative effects of pressure and swirl distortions to improve stall margin of the engine 110.

The method further includes continually adjusting the position of the movable closure 30 based on the preselected operating condition of the engine 110. If the controller 52 detects the cruise condition, the controller 52 directs the actuator 50 to move the movable closure 30 back to the closed position. In other instances, the controller 52 may direct the actuator 50 to control the position of the movable closure 30 as discussed above based on the preprogrammed aircraft maneuvers and/or the measurements from the sensors.

Another embodiment of a fan case assembly 210 in accordance with the present disclosure is shown in FIGS. 8-11. The fan case assembly 210 is substantially similar to the fan case assembly 10 shown in FIGS. 1-7C and described herein. Accordingly, similar reference numbers in the 200 series indicate features that are common between the fan case assembly 10 and the fan case assembly 210. The description of the fan case assembly 10 is incorporated by reference to apply to the fan case assembly 210, except in instances when it conflicts with the specific description and the drawings of the fan case assembly 210.

Figure 8:
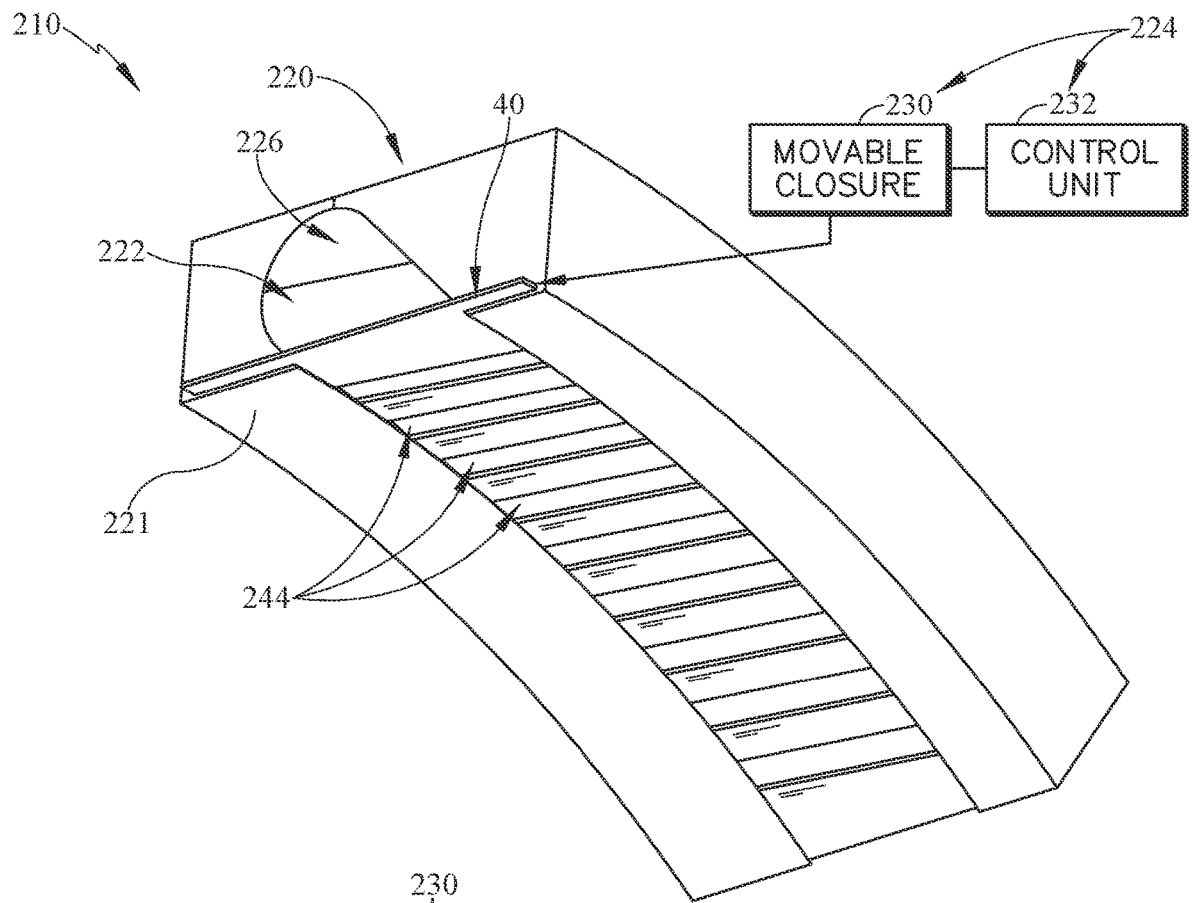
FIG. 8 is a perspective view of another embodiment of a fan case assembly included in the gas turbine engine of FIG. 1 showing the fan case assembly includes a case that defines a plenum, a plurality of a plurality of vanes arranged in the plenum to form a plurality of inlet openings in fluid communication with the plenum, and an inlet distortion mitigation system that includes a movable closure mounted for rotation about the axis relative to the case to control fluid communication between the plenum and the gas path of the gas turbine engine.
Figure 9:
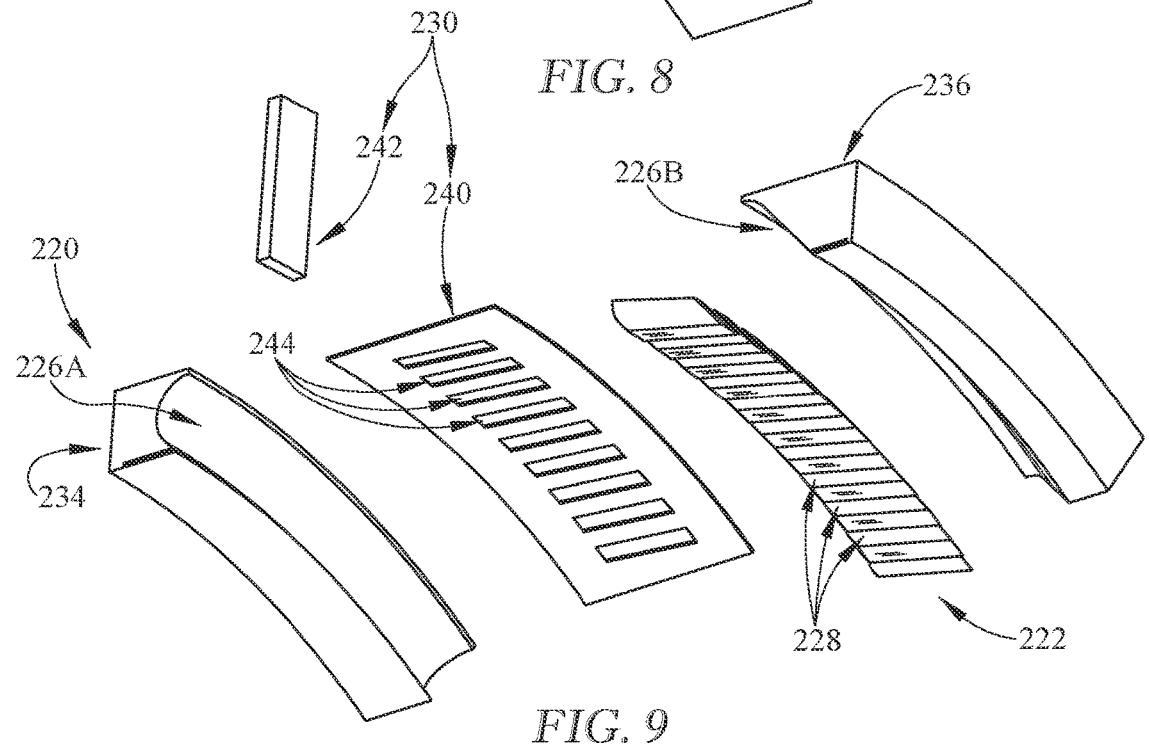
FIG. 9 is an exploded view of the fan case assembly of FIG. 8 showing the movable closure includes a plurality of slots that extend axially and circumferentially so as to align with the openings between the vanes that extend axially and circumferentially.
Figure 10:
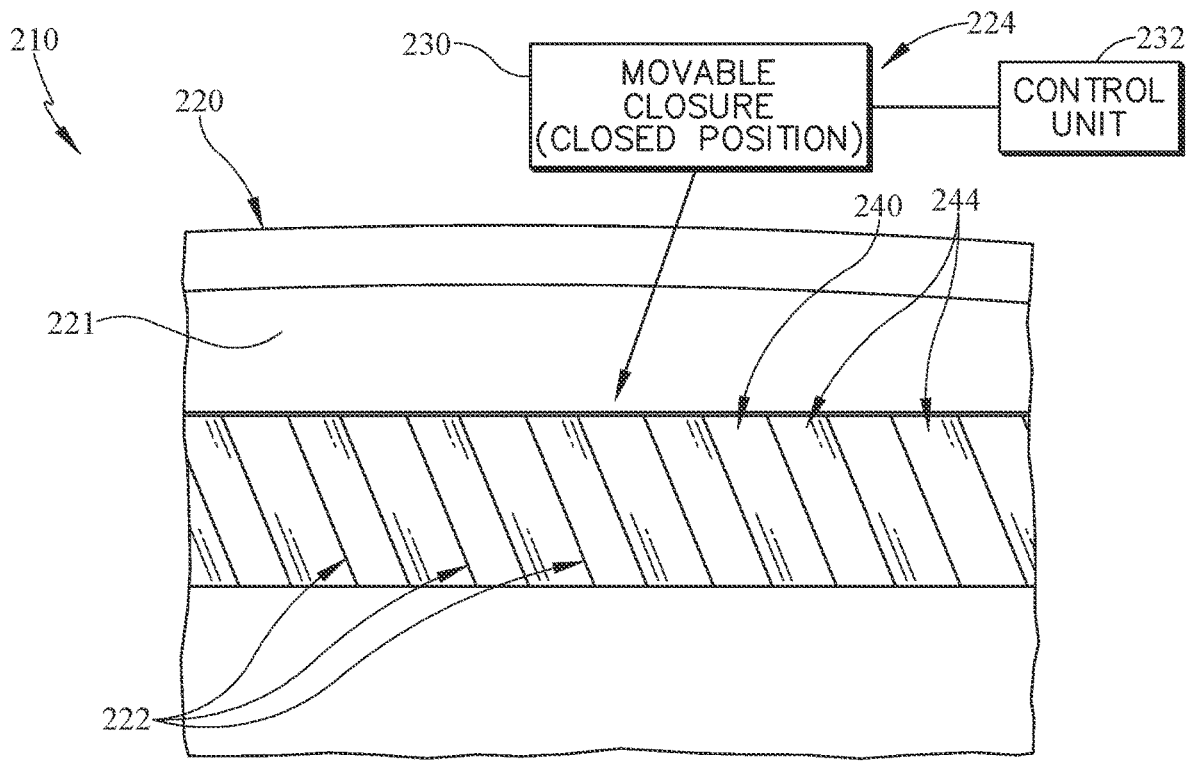
FIG. 10 is a radially-outwardly looking view of the fan case assembly of FIG. 8 with the movable closure in the closed position.
Figure 11:
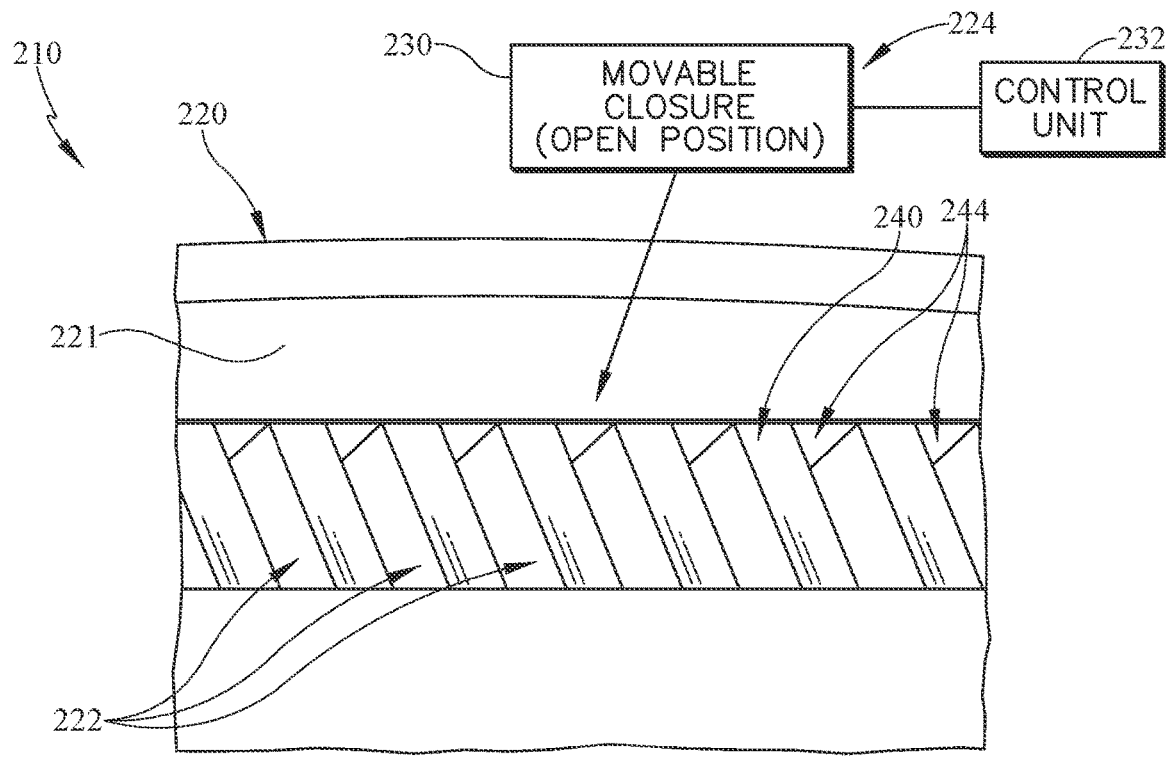
FIG. 11 is a radially-outwardly looking view of the fan case assembly of FIG. 8 with the movable closure in the open position.

The fan case assembly 210 includes, among other components, a case 220, a plurality of vanes 222, and an inlet distortion mitigation system 224 as shown in FIGS. 8 and 9. The case 220 extends circumferentially at least partway about the axis 11. The case 220 is formed to define a plenum 226 that extends circumferentially at least partway about the axis 11. The plurality of vanes 222 are arranged in the plenum 226. The plurality of vanes 222 are spaced apart circumferentially about the axis 11 to define a plurality of openings 228 in fluid communication with the plenum 226. The inlet distortion mitigation system 224 is configured conditions to control fluid communication between the plenum 226 and the gas path 25.

Unlike the vanes 22 in the embodiment of FIGS. 2-4, the plurality of vanes 222 extend axially and circumferentially across the plenum 226 as shown in FIGS. 9-12. As such, each of the slots 244 in the movable closure 230 extend axially and circumferentially to align with the openings 228 defined by the vanes 222.

The case 220 includes a forward section 234 and an aft section 236 as shown in FIG. 9. The forward section 234 is coupled to the aft section 236 to form the case 220. The forward and aft sections 234, 236 trap the movable closure 230 in a channel 238 formed by the case 220.

In the illustrative embodiment, the forward section 234 of the case 220 is formed to define a forward portion 226A of the plenum 226. The aft section 236 of the case 20 is formed to define an aft portion 226B of the plenum 226.

In the illustrative embodiment, the forward section 234 of the case 220 is formed to define a forward portion 238A of the channel 238 as shown in FIG. 9. The aft section 236 of the case 220 is formed to define an aft portion 238B of the channel 238 as shown in FIG. 9.

The movable closure 230 includes a band 240 and a rod 242 as shown in FIGS. 8 and 9. The band 240 extends circumferentially at least partway about the axis 11. The rod 242 extends radially outward from the band 240 through the case 220 and couples to the control unit 232. The plurality of slots 244 extend radially through the band 240 as shown in FIGS. 8-11.

Another embodiment of a fan case assembly 310 in accordance with the present disclosure is shown in FIGS. 12-15. The fan case assembly 310 is substantially similar to the fan case assembly 10 shown in FIGS. 1-7C and described herein. Accordingly, similar reference numbers in the 300 series indicate features that are common between the fan case assembly 10 and the fan case assembly 310. The description of the fan case assembly 10 is incorporated by reference to apply to the fan case assembly 310, except in instances when it conflicts with the specific description and the drawings of the fan case assembly 310.

Figure 12:
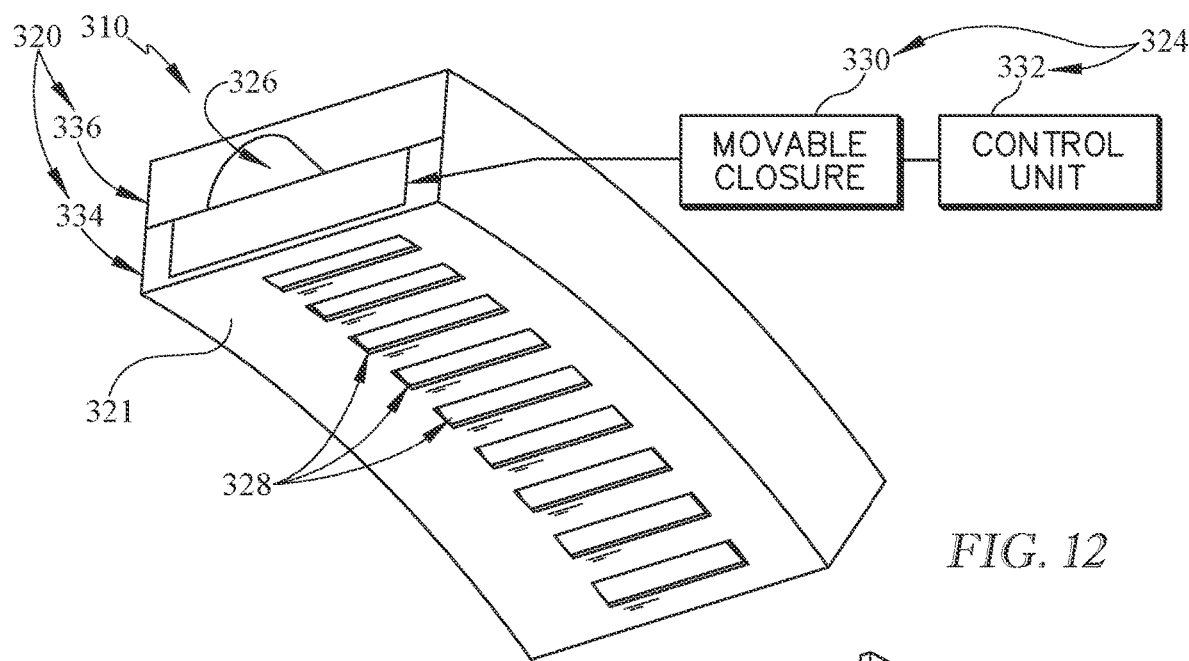
FIG. 12 is a perspective view of another embodiment of a fan case assembly included in the gas path of the gas turbine engine of FIG. 1 showing the fan case assembly includes a case that defines a plenum and a plurality of inlet openings the open to the plenum and an inlet distortion mitigation system that includes a movable closure mounted for rotation about the axis relative to the case between a closed position as shown in FIG. 14 and an open position as shown in FIG. 15 to control fluid communication between the plenum and the gas path of the gas turbine engine through the plurality of inlet openings in the case.
Figure 13:
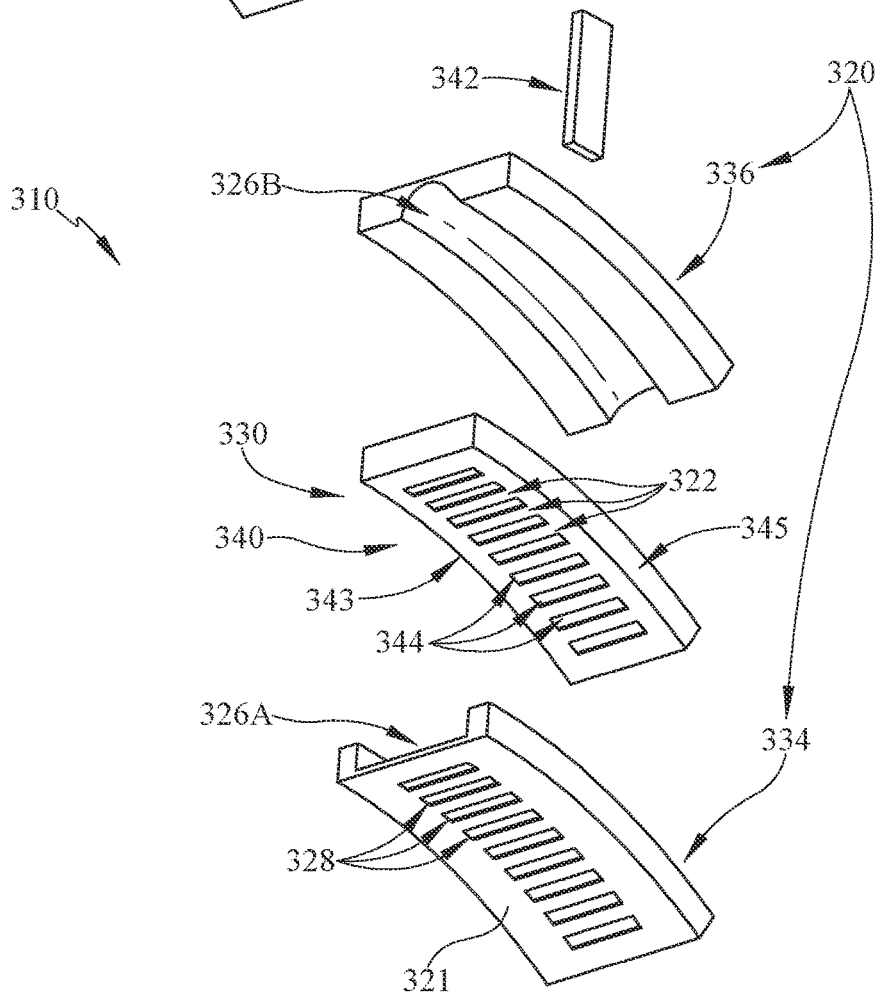
FIG. 13 is an exploded view of the fan case assembly of FIG. 12 showing the case is a split case including an outer section and an inner section that couples with the outer section to trap the movable closure therebetween, and further showing the movable closure includes a plurality of slots that extend radially and circumferentially through the movable closure to define a plurality of vanes.

The fan case assembly 310 includes, among other components, a case 320 and an inlet distortion mitigation system 324 as shown in FIGS. 12 and 13. The case 320 extends circumferentially at least partway about the axis 11. The case 320 is formed to define a plenum 326 that extends circumferentially at least partway about the axis 11 and a plurality of openings 328 that open to the plenum 326. The inlet distortion mitigation system 324 is configured conditions to control fluid communication between the plenum 326 and the gas path 35.

The inlet distortion mitigation system 324 includes a movable closure 330 and a control unit 332 as shown in FIGS. 12-15. The control unit 332 is coupled to the movable closure 330 to control rotation thereof.

Unlike the movable closure 30 in the embodiment of FIGS. 3-4, the movable closure 330 defines the plurality of vanes 322. The movable closure 330 is formed to include a plurality of slots 344 that extend radially there through to define the plurality of vanes 322. Therefore, the vanes 322 rotate relative to the case 320.

The movable band 330 includes a band 340 and a rod 342 as shown in FIGS. 12 and 13. The band 340 extends circumferentially at least partway about the axis 11. The rod 342 extends radially outward from the band 340 through the case 320 and couples to the control unit 332. The plurality of slots 344 extend radially through the band 340 as shown in FIGS. 12-15.

Figure 14:
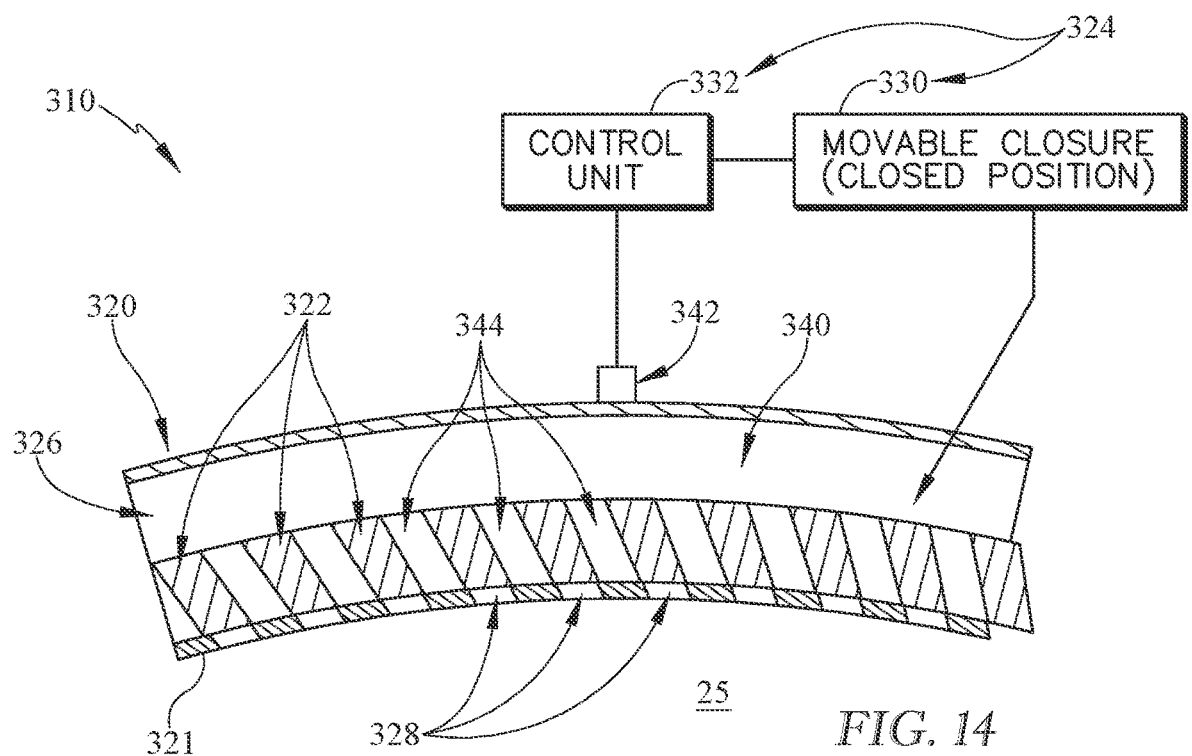
FIG. 14 is a cross-section view of the fan case assembly of FIG. 12 showing the movable closure in the closed position in which the movable closure covers the plurality of inlet openings to block fluid communication between the gas path and the plenum.
Figure 15:
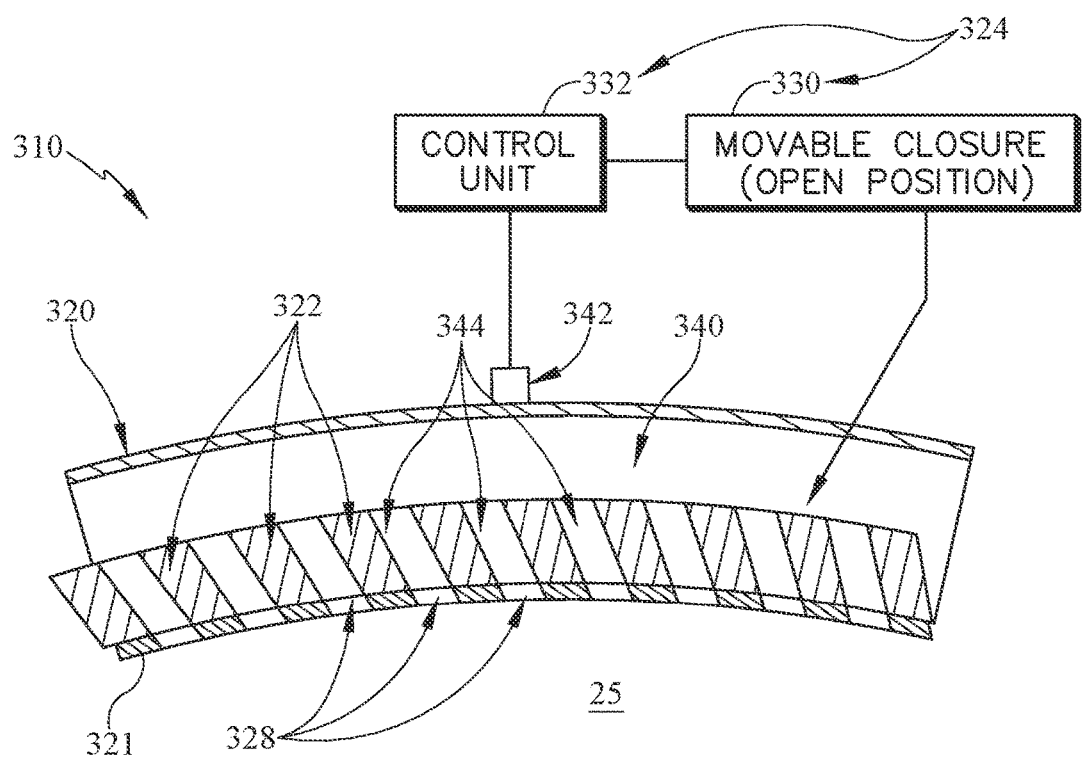
FIG. 15 is a cross-section view of the fan case assembly of FIG. 12 showing the movable closure in the open position in which the plurality of slots formed in the movable closure are aligned with the plurality of inlet openings to allow fluid communication between the gas path and the plenum.

The movable closure 330 is mounted for rotation about the axis 11 relative to the case 320 between the open position as shown in FIG. 14 and the closed position as shown in FIG. 15. The control unit 332 is configured to move the movable closure 330 between the different positions in response to preselected operating conditions to control fluid communication between the plenum 326 and the gas path 25 so as to minimize the negative effects of pressure and swirl distortions in the gas turbine engine 110 to improve stall margin.

In the closed position, the movable closure 330 covers the plurality of inlet openings 328 to the plenum 326 to block fluid communication between the gas path 25 and the plenum 326 as shown in FIG. 14. The vanes 322 cover each of the opening 328 formed in the case 320 as shown in FIG. 14.

In the open position, the plurality of slots 344 in the movable closure 330 are aligned with the plurality of inlet openings 328 to allow fluid communication between the gas path 25 and the plenum 326 as shown in FIG. 15. By aligning the slots 344 with the openings 328, the movable closure 330 forms the vanes 322 leading to the plenum 326 since the band 340 of the movable closure 330 has a greater thickness compared to the other embodiments.

The band 340 includes the plurality of vanes 322, a forward band section 343, and an aft band section 345 as shown in FIG. 13. The aft band section 345 is spaced apart axially from the forward band section 343. The plurality of vanes 322 extend axially between and interconnect the forward band section 343 and the aft band section 345.

The forward and aft band sections 343, 345 connect the plurality of vanes 322 together so that the vanes 322 move together. The plurality of vanes 322 are spaced apart circumferentially from each other to form the slots 344 there between each of the vanes 322. In some embodiments, the band 340 only includes one of the forward band section 343 and the aft band section 345 and the other is omitted.

Turning again to the case 320, the case 320 includes an inner section 334 and an outer section 336 as shown in FIG. 13. The inner section 334 is coupled to the outer section 336 to form the case 320. The inner and outer sections 334, 336 trap the movable closure 330 between the two sections 334, 336.

In the illustrative embodiment, the inner section 334 of the case 320 is formed to define an inner portion 326A of the plenum 326. The outer section 336 of the case 30 is formed to define an outer portion 326B of the plenum 326.

In some embodiments, the case 320 may be split with a forward section and an aft section so that the movable closure 330 is trapped therebetween. In other embodiments, the case 320 may be split in another way so as to be able to insert the movable closure 330 into the case 320.

When dealing with embedded inlet distortion, there may be a steep trade between stall margin and performance of the engine. There may be points during a mission or moments with maneuvers where it may be desirable to incorporate a different available stall margin or to be able to more evenly distribute flows. Attempting to solve the worst stall condition, while maintaining performance over all of the cycle or flight conditions may be difficult and result in compromised efficiency or a limited flight envelope.

Therefore, the fan 112 includes an inlet distortion mitigation system 24, 224 which includes the movable closure 30, 230 configured to control fluid communication between the plenum 26, 226 and the gas path 25. The plenum 26, 226 is formed in the case 20, 220 at the leading edge of the fan blades 14. The plurality of vanes 22, 222 are arranged in the plenum 26, 226.

In the first condition, or the closed position, the openings 28, 228 between the vanes 22, 222 to the plenum 26, 226 would be closed so no additional stall margin is created but performance is not compromised. In a second condition, or the open position, the movable closure 30, 230 rotates to permit flows into the plenum 26, 226. This permits air pressure and flows to better equalize circumferentially to improve stall margin.

The movable closure 30, 230 used to control flow to the plenum 26, 226 permits the fan 112 to optimize at a cruise point with less distortion, while being able to maintain adequate stall margin at another condition. By activating the movable closure 30, 230 to trade efficiency for stall margin improvement, but not having to live with that trade at all times, the inlet distortion mitigation system 24, 224 allows optimization of the fan 112.

The movable closure 30, 230 may rotate relative to the case 20, 220 to open access to the vaned plenum 26, 226. This permits the turbofan engine 110 to be designed with two potential configurations which allow it to be optimized to different conditions with one assembly. This is beneficial to eliminating a troublesome trade between stall margin and performance potentially, or may be able to handle more extreme inlet distortion during maneuvering.

The fan case assembly 10, 210 includes the case 20, 220 with the vaned plenum 26, 226. The vanes 22, 222 start at the flow path or gas path 25. The plenum 26, 226 has a cross-section shape that resembles a forward leaning cross-sectional shape or tear drop instead of purely a radial or rectilinear design. In some embodiments, the plenum 26, 226 has another suitable cross-section shape.

The air flows radially into the vanes 22, 222, which may be tilted circumferentially, and then can flow tangentially in the plenum 26, 226 to other portions of the fan 112, which helps to mitigate stall. Stall may develop locally at one circumferential location, but then flows from other portions leak into this sector, helping to overcome stall development. This may be particularly helpful with distortion where greater pockets of pressure relative to the average pressure may exist.

The movable closure 30, 230 is configured to rotate relative to the case 20, 220. The movable closure 30, 230 may include a thin bent sheet of material or potentially a molded/laid up composite one in a hoop. This hoop may have about 50% openness in the portion where the vanes would go. This would allow for the hoop to be rotated circumferentially and then be open or closed (or a percentage open) with simple tangential controls.

The movable closure 30, 230 includes the rod 42 that extends through the case 20, 220. The rod 42 controls the rotation of the hoop or band 40, 240 from the outside of the case 20, 220. This incorporates a small step between the case 20, 220 and the band 40, 240 but may enable the trade between efficiency and stall margin of the system. Alternatively, since it is a hoop it may be acceptable to have the band 40, 240 on the gas path 25 entirely.

In the open configuration, the closed portion of the band 40, 240 aligns with the vanes 22, 222. Moving the band 40, 240 from perfect alignment will start to close the openings 28, 228 as shown in FIGS. 6A and 6B and then fully close as shown in FIGS. 5A and 5B.

This concept could also be used with openings skewed as shown in FIGS. 8-11. The movable closure 230 rotates as the movable closure 230 axially translates. The movable closure 230 rotates in a first direction about the axis 11 as the movable closure 230 axially translates forward. Conversely, the movable closure 230 rotates in a second direction about the axis 11 opposite the first direction as the movable closure 230 axially translates aft. Some casing treatments use blade angle slots or similar to target tip leakage stall avoidance.

The control unit 32 has the ability to measure pressure or swirl variation and has a memory to program response to maneuvers or flight conditions. The control unit 32 then moves the movable closure 30 based on the measurements or programed responses. In some embodiments, the movable closure 30, 230 may be ganged to local sectors and just activated in several different portions as needed to more locally control stall. For example, if a select sector needs to flow across its region, but not as a fully hoop.

The control unit 32 is configured to use sensor inputs from a sensor 56 to control operation of the movable closure 30. The sensor 56 may include one of or a combination of a static wall pressure sensor, an altitude sensor, sensors configured to detect twisting of the fan blades 14, sensors configured to detect the tip timing of the fan blades 14, sensors configured to measure a rotational speed of the fan blades 14, a dynamic pressure transducer sensor. The combination of some sensors may provide data to engage mitigation of the effects of distortion, while other sensors may detect the maneuvers or mission phase.

For example, altitude and fan speed may provide data to engage mitigation, while also providing maneuver detection or regime/mission phase framing of control logic. Additionally, static wall pressure, dynamic pressure transducers, blade tip timing, blade untwist as well as fan speed and altitude may be used in distortion/effect detection for the control logic.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan case assembly adapted for use with a gas turbine engine, the fan case assembly comprising:
   a case that extends circumferentially at least partway about an axis to define an outer boundary of a gas path of the gas turbine engine, the case formed to define a plenum that extends circumferentially at least partway about the axis and is open to the gas path of the gas turbine engine,
   a plurality of vanes arranged in the plenum and spaced apart circumferentially about the axis to define a plurality of inlet openings in fluid communication with the plenum, and
   an inlet distortion mitigation system including a movable closure mounted for movement relative to the case and a control unit, the movable closure configured to rotate about the axis relative to the case to move between a closed position in which the movable closure covers the plurality of inlet openings to the plenum to block fluid communication between the gas path and the plenum and an open position in which a plurality of slots in the movable closure are aligned with the plurality of inlet openings to allow fluid communication between the gas path and the plenum, and the control unit configured to move the movable closure between the closed position and the open position in response to preselected operating conditions to minimize negative effects of pressure and swirl distortions in the gas turbine engine to improve stall margin for the gas turbine engine.

2. The fan case assembly of claim 1, wherein the movable closure includes a band that extends circumferentially at least partway about the axis and axially between a first end located axially forward of the plurality of vanes and a second end located axially aft of the plurality of vanes and a rod that extends radially outward from the band through the case and couples to the control unit, and wherein the plurality of slots extend radially through the band.

3. The fan case assembly of claim 2, wherein the case is formed into to include a channel that extends axially and circumferentially at least part way about the axis and the movable closure is located in the channel formed in the case.

4. The fan case assembly of claim 2, wherein each vane of the plurality of vanes extends axially and circumferentially across the plenum and the plurality of slots formed in the movable closure extend axially and circumferentially.

5. The fan case assembly of claim 2, wherein the control unit includes at least one actuator coupled to the rod of the movable closure and configured to drive rotation of the movable closure, a controller coupled to the at least one actuator and configured to direct the at least one actuator to rotate the movable closure to the closed position when the gas turbine engine is in a cruise condition included in the preselected operating conditions.

6. The fan case assembly of claim 1, wherein the movable closure is configured to rotate about the axis relative to the case to a plurality of intermediate positions between the closed position and the open position in which the plurality of slots formed in the movable closure are partially aligned with the plurality of inlet openings to vary the fluid communication between the gas path of the gas turbine engine and the plenum.

7. The fan case assembly of claim 1, wherein the control unit includes at least one actuator coupled to the movable closure and configured to drive rotation of the movable closure, a controller coupled to the at least one actuator and configured to direct the at least one actuator to rotate the movable closure to the closed position when the gas turbine engine is in a cruise condition included in the preselected operating conditions.

8. The fan case assembly of claim 7, wherein the control unit further includes a memory coupled to the controller, the memory including a plurality of preprogrammed aircraft maneuvers that each correspond to one of the closed position, the open position, and a plurality of intermediate positions between the closed position and the open position, and the controller is configured to detect a preprogrammed aircraft maneuver included in the plurality of preprogrammed aircraft maneuvers on the memory and direct the at least one actuator to move the movable closure to a corresponding position in response to detecting the preprogrammed aircraft maneuver.

9. The fan case assembly of claim 8, wherein the control unit further includes at least one sensor coupled to the controller and configured to measure one of pressure, air speed, altitude, blade tip timing, blade rotational speed, attitude, and acceleration, and wherein the controller is configured to receive a measurement from the at least one sensor and direct the at least one actuator to move the movable closure to a corresponding position in response to the measurement of the at least one sensor.

10. The fan case assembly of claim 7, wherein the control unit further includes at least one sensor coupled to the controller and configured to measure one of pressure, air speed, altitude, blade tip timing, blade rotational speed, attitude, and acceleration, and wherein the controller is configured to receive a measurement from the at least one sensor and direct the at least one actuator to move the movable closure to a corresponding position in response to the measurement of the at least one sensor.

11. A gas turbine engine comprising:
   a fan including a fan rotor configured to rotate about an axis of the gas turbine engine and a plurality of fan blades coupled to the fan rotor for rotation therewith,
   a fan case assembly that extends circumferentially around the plurality of fan blades radially outward of the plurality of fan blades, the fan case assembly comprising a case that extends circumferentially at least partway about the axis, the case formed to define a plenum that extends circumferentially at least partway about the axis and is open to a gas path of the gas turbine engine, a plurality of vanes arranged in the plenum and spaced apart circumferentially about the axis to define a plurality of inlet openings in fluid communication with the plenum, and an inlet distortion mitigation system including a movable closure mounted for movement relative to the case and a control unit, the movable closure configured to rotate relative to the case to move between a closed position in which the movable closure covers the plurality of inlet openings to the plenum and an open position in which a plurality of slots in the movable closure are aligned with the plurality of inlet openings, and the control unit configured to move the movable closure between the closed position and the open position in response to preselected operating conditions.

12. The gas turbine engine of claim 11, wherein the movable closure includes a band that extends circumferentially at least partway about the axis and axially between a first end located axially forward of the plurality of vanes and a second end located axially aft of the plurality of vanes and a rod that extends radially outward from the band through the case and couples to the control unit, and wherein the plurality of slots extend radially through the band.

13. The gas turbine engine of claim 12, wherein the case is formed to include a channel that extends axially and circumferentially at least part way about the axis and the movable closure is located in the channel formed in the case.

14. The gas turbine engine of claim 13, wherein each vane of the plurality of vanes extends axially and circumferentially across the plenum and the plurality of slots formed in the movable closure extend axially and circumferentially.

15. The gas turbine engine of claim 11, wherein the movable closure is configured to rotate relative to the case to a plurality of intermediate positions between the closed position and the open position in which the plurality of slots formed in the movable closure are partially aligned with the plurality of inlet openings to vary the fluid communication between the gas path of the gas turbine engine and the plenum.

16. The gas turbine engine of claim 11, wherein the control unit includes at least one actuator coupled to the movable closure and configured to drive rotation of the movable closure, a controller coupled to the at least one actuator and configured to direct the at least one actuator to rotate the movable closure to the closed position when the gas turbine engine is in a cruise condition included in the preselected operating conditions.

17. The gas turbine engine of claim 16, wherein the control unit further includes a memory coupled to the controller, the memory including a plurality of preprogrammed aircraft maneuvers that each correspond to one of the closed position, the open position, and a plurality of intermediate positions between the closed position and the open position, and the controller is configured to detect a preprogrammed aircraft maneuver included in the plurality of preprogrammed aircraft maneuvers on the memory and direct the at least one actuator to move the movable closure to a corresponding position in response to detecting the preprogrammed aircraft maneuver.

18. The gas turbine engine of claim 17, wherein the control unit further includes at least one sensor coupled to the controller and configured to measure one of pressure, air speed, and acceleration, and wherein the controller is configured to receive a measurement from the at least one sensor and direct the at least one actuator to move the movable closure to a corresponding position in response to the measurement of the at least one sensor.

19. The gas turbine engine of claim 16, wherein the control unit further includes at least one sensor coupled to the controller and configured to measure one of pressure, air speed, altitude, blade tip timing, blade rotational speed, attitude, and acceleration, and wherein the controller is configured to receive a measurement from the at least one sensor and direct the at least one actuator to move the movable closure to a corresponding position in response to the measurement of the at least one sensor.

20. A fan case assembly adapted for use with a gas turbine engine, the fan case assembly comprising:

a case that extends circumferentially at least partway about an axis to define an outer boundary of a gas path of the gas turbine engine, the case formed to define a plenum that extends circumferentially at least partway about the axis and a plurality of inlet openings in fluid communication with the plenum and the gas turbine engine, and an inlet distortion mitigation system including a movable closure mounted for movement relative to the case and a control unit, the movable closure configured to rotate about the axis relative to the case to move between a closed position in which the movable closure covers the plurality of inlet openings to block fluid communication between the gas path and the plenum and an open position in which a plurality of slots in the movable closure are aligned with the plurality of inlet openings to allow fluid communication between the gas path and the plenum, and the control unit configured to move the movable closure between the closed position and the open position in response to preselected operating conditions.

\* \* \* \* \*